(12) United States Patent
Yang et al.

(10) Patent No.: US 11,877,643 B2
(45) Date of Patent: *Jan. 23, 2024

(54) TRACKING ATTACHMENT FOR AN ORAL CARE IMPLEMENT

(71) Applicant: Colgate-Palmolive Company, New York, NY (US)

(72) Inventors: Wu Yang, Shanghai (CN); Takahide Okai, Highland Park, NJ (US)

(73) Assignee: Colgate-Palmolive Company, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/987,328

(22) Filed: Nov. 15, 2022

(65) Prior Publication Data

US 2023/0073444 A1 Mar. 9, 2023

Related U.S. Application Data

(63) Continuation of application No. 16/483,051, filed as application No. PCT/CN2018/098400 on Aug. 3, 2018, now Pat. No. 11,523,678.

(51) Int. Cl.
*A46B 15/00* (2006.01)
*A61C 17/22* (2006.01)

(52) U.S. Cl.
CPC ...... *A46B 15/0006* (2013.01); *A46B 15/0002* (2013.01); *A46B 15/0022* (2013.01);
(Continued)

(58) Field of Classification Search
CPC . A46B 5/026; A46B 15/0002; A46B 15/0006; A46B 15/0038; A46B 15/0097; A61C 17/222; A61C 17/225
See application file for complete search history.

(56) References Cited

U.S. PATENT DOCUMENTS

| | | | |
|---|---|---|---|
| 7,600,284 B2 * | 10/2009 | Hui | A61C 17/225 15/105 |
| 8,137,109 B2 | 3/2012 | Gatzemeyer et al. | |

(Continued)

FOREIGN PATENT DOCUMENTS

| | | |
|---|---|---|
| CN | 202552721 U | 11/2012 |
| CN | 105012035 A | 11/2015 |

(Continued)

OTHER PUBLICATIONS

International Search Report and Written Opinion in International Application No. PCT/CN2018/098400, dated Apr. 30, 2019.

*Primary Examiner* — Randall E Chin

(57) ABSTRACT

A tracking attachment for an oral care implement that includes a housing and a tracking unit configured to track position, orientation, or movement of the oral care implement. The housing may define a receiving cavity that is configured to receive a portion of the oral care implement. The housing may include a first housing portion having an inner surface that defines a first portion of the receiving cavity that is open at both of the first and second ends of the first housing portion and a second housing portion that mates with the first housing portion to detachably couple the second housing portion to the first housing portion. The second housing portion may have an inner surface that defines a second portion of the receiving cavity that is open at the second end of the second housing portion.

15 Claims, 15 Drawing Sheets

(52) U.S. Cl.
CPC ........ *A46B 15/0097* (2013.01); *A61C 17/222* (2013.01); *A61C 17/225* (2013.01); *A46B 2200/1066* (2013.01)

(56) References Cited

U.S. PATENT DOCUMENTS

| | | |
|---|---|---|
| 8,224,024 B2 | 7/2012 | Foxlin et al. |
| 8,272,091 B2 | 9/2012 | Hwang et al. |
| 9,427,078 B2 | 8/2016 | Farrell et al. |
| 9,642,684 B2 | 5/2017 | Yoshida et al. |
| 9,750,586 B2 | 9/2017 | Hwang et al. |
| 10,117,508 B2 | 11/2018 | Vetter et al. |
| 10,172,443 B2 | 1/2019 | Wang et al. |
| 10,299,902 B2 | 5/2019 | Vetter et al. |
| 10,799,155 B2 | 10/2020 | El Kouby-Benichou et al. |
| 10,835,028 B2 | 11/2020 | Gatzemeyer et al. |
| 10,925,387 B2 | 2/2021 | Nishiura et al. |
| 11,006,862 B2 | 5/2021 | El Kouby-Benichou et al. |
| 11,363,971 B2 | 6/2022 | El Kouby-Benichou et al. |
| 2004/0187889 A1 | 9/2004 | Kemp et al. |
| 2004/0236628 A1 | 11/2004 | Pak |
| 2009/0092955 A1 | 4/2009 | Hwang |
| 2009/0215015 A1 | 8/2009 | Chu |
| 2014/0065588 A1 | 3/2014 | Jacobson et al. |
| 2015/0127371 A1 | 5/2015 | Dykes et al. |
| 2015/0173501 A1 | 6/2015 | Scott |
| 2015/0335145 A1 | 11/2015 | Bloch et al. |
| 2016/0081778 A1 | 3/2016 | Hwang et al. |
| 2016/0235191 A1 | 8/2016 | Trent |
| 2017/0065386 A1 | 3/2017 | Farrell et al. |
| 2017/0116665 A1 | 4/2017 | Alzahrani |
| 2017/0238692 A1 | 8/2017 | Sarubbo |
| 2018/0214256 A1 | 8/2018 | Miyamichi et al. |
| 2019/0200902 A1 | 7/2019 | El Kouby-Benichou et al. |
| 2021/0120947 A1 | 4/2021 | Machiorlette et al. |
| 2021/0353045 A1 | 11/2021 | Yang et al. |

FOREIGN PATENT DOCUMENTS

| | | | |
|---|---|---|---|
| CN | 106998900 A | | 8/2017 |
| CN | 108066030 A | | 5/2018 |
| EP | 3337352 | | 6/2018 |
| KR | 20130006950 | | 12/2013 |
| KR | 10-2014-0059632 A | * | 5/2014 |
| KR | 101568105 | | 6/2015 |
| KR | 20150063322 | | 6/2015 |
| RU | 2445938 | | 3/2012 |
| TW | 201206370 | | 2/2012 |
| WO | 2014/202250 | | 12/2014 |
| WO | 2016/020803 | | 2/2016 |
| WO | 2016/047793 | | 3/2016 |
| WO | 2017/029469 | | 2/2017 |
| WO | 2017/157411 | | 9/2017 |
| WO | 2018/046723 | | 3/2018 |
| WO | 2020/024238 | | 2/2020 |

* cited by examiner

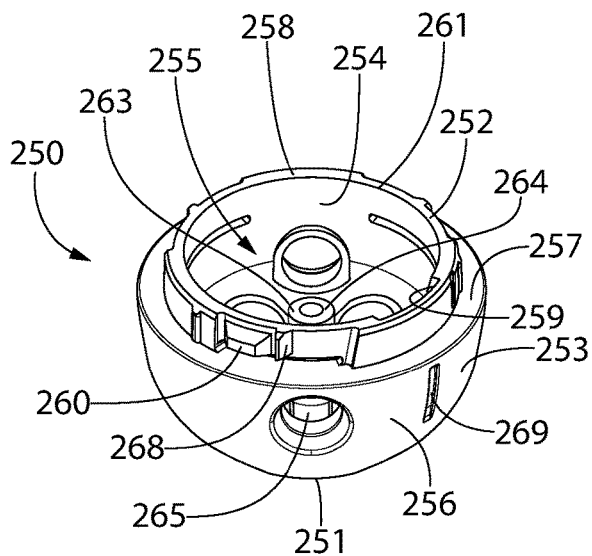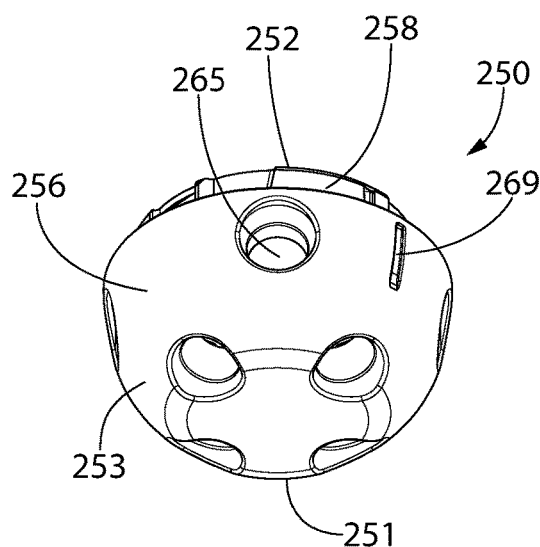
FIG. 6A     FIG. 6B
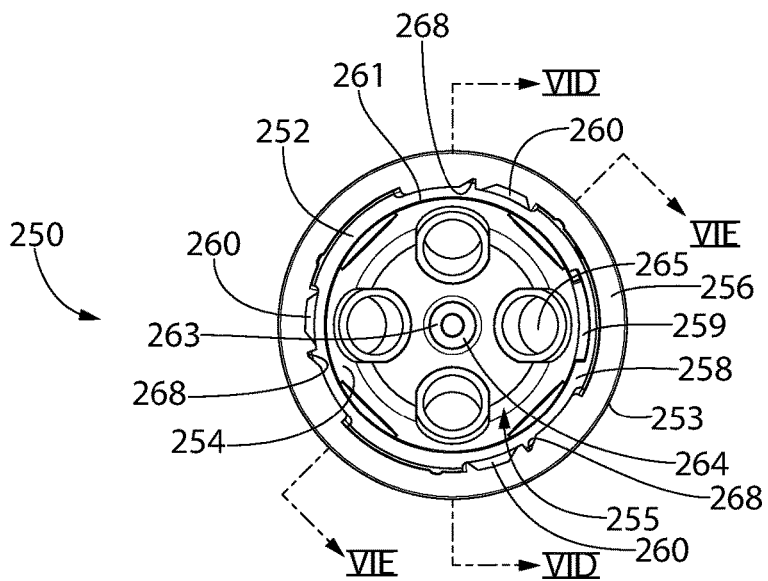
FIG. 6C

TRACKING ATTACHMENT FOR AN ORAL CARE IMPLEMENT

CROSS-REFERENCE TO RELATED APPLICATIONS

The present application is a continuation of U.S. patent application Ser. No. 16/483,051, filed Aug. 2, 2019, now U.S. Pat. No. 11,523,678, which is a national stage entry of PCT/CN2018/098400, filed Aug. 3, 2018, the entireties of which are incorporated herein by reference.

BACKGROUND

There is a current trend where people desire to have more data about their daily habits readily presented to them. For example, many people use watches and smart phones to track their daily movements including counting their steps, distance walked, calories burned, and the like. However, people's desire for information is not limited to exercise and movement, but expands into all categories of life, including oral care. One reason that there is a desire to obtain information about a user's oral hygiene habits is to assist parents in ensuring that their children are properly brushing their teeth. In this regard, expensive electronic-based oral care implements have been developed that track this information. However, there continues to be a need to improve these devices, both aesthetically and functionally, and in terms of price-point. Thus, a need exists for an oral care system that includes an oral care implement and a tracking attachment that readily attaches to the oral care implement in a detachable manner.

BRIEF SUMMARY

The present invention is directed to an oral care system that includes an oral care implement and a tracking attachment. In one embodiment, the invention is directed to the tracking attachment itself. In another embodiment, the invention is directed to a method of assembling the oral care system.

In one aspect, the invention may be a tracking attachment for an oral care implement, the tracking attachment comprising: a housing defining a receiving cavity that is configured to receive a portion of an oral care implement, the housing comprising: a first housing portion extending from a first end to a second end and comprising a first connection element, the first housing portion having an inner surface that defines a first portion of the receiving cavity that is open at both of the first and second ends of the first housing portion; and a second housing portion extending from a first end to a second end and having a second connection element that mates with the first connection element of the first housing portion to detachably couple the second housing portion to the first housing portion, the second housing portion having an inner surface that defines a second portion of the receiving cavity that is open at the second end of the second housing portion; and a tracking unit configured to facilitate tracking at least one of a position, orientation, or movement of the oral care implement.

In another aspect, the invention may be a tracking attachment for an oral care implement, the tracking attachment comprising: a housing formed of a rigid material, the housing having an outer surface and an inner surface that defines a receiving cavity having an open top end that is configured to receive a portion of an oral care implement; a plurality of visual markers formed of a resilient material, each of the plurality of visual markers coupled to the housing and protruding from the outer surface of the housing; and wherein the plurality of visual markers are configured to facilitate tracking at least one of a position, orientation, or movement of the oral care implement.

In yet another aspect, the invention may be an oral care system comprising: an oral care implement comprising a handle and a head; and a tracking attachment coupled to the oral care implement, the tracking attachment comprising: a housing defining a receiving cavity within which a portion of the oral care implement is positioned, the housing comprising: a first housing portion having an inner surface that defines a first portion of the receiving cavity; and a second housing portion having an inner surface that defines a second portion of the receiving cavity, the second housing portion detachably coupled to the first housing portion; a tracking unit configured to facilitate tracking at least one of a position, orientation, or movement of a portion of the oral care implement; and wherein a first portion of the handle is positioned within the first portion of the receiving cavity and a second portion of the handle is positioned within the second portion of the receiving cavity.

In still another aspect, the invention may be an oral care system comprising: an oral care implement extending from a proximal end to a distal end along a longitudinal axis and having a proximal portion that includes the proximal end, the proximal portion of the oral care implement having a transverse cross-sectional profile; a tracking attachment coupled to the oral care implement, the tracking attachment comprising: a housing extending from a first end to a second end and having an inner surface that defines a receiving cavity, a first end of the receiving cavity being closed and a second end of the receiving cavity being open; and a tracking unit configured to facilitate tracking at least one of a position, orientation, or movement of the oral care implement; wherein a portion of the oral care implement is positioned within the receiving cavity of the tracking attachment to couple the tracking attachment to the oral care implement, the second end of the tracking attachment being located closer to the distal end of the oral care implement than the first end of the tracking attachment; and wherein the transverse cross-sectional profile of the proximal portion of the oral care implement does not fit through the opening in the second end of the tracking attachment.

In yet another aspect, the invention may be an oral care system comprising: an oral care implement comprising a handle and a head, the handle having a first alignment feature; a tracking attachment coupled to the oral care implement, the tracking attachment comprising: a housing having a second alignment feature; and a tracking unit configured to facilitate tracking at least one of a position, orientation, or movement of a portion of the oral care implement; and wherein the first and second alignment features mate with one another to maintain the tracking attachment and the oral care implement in a predetermined relative angular orientation.

In still another aspect, the invention may be an oral care system comprising: an oral care implement; a tracking attachment coupled to the oral care implement, the tracking attachment comprising: a housing having an inner surface that defines a receiving cavity having a closed bottom end and an open top end, a support post extending from the closed bottom end to a distal end; and a tracking unit configured to facilitate tracking at least one of a position, orientation, or movement of a portion of the oral care implement; and wherein a portion of the oral care implement is positioned in the receiving cavity of the housing with a proximal end of the oral care implement resting on the distal end of the support post.

In a further aspect, the invention may be a method of assembling an oral care system that includes an oral care implement and a tracking attachment, the tracking attachment comprising a tracking unit configured to facilitate tracking at least one of a position, orientation, or movement of a portion of the oral care implement, the method comprising: aligning a first opening in a first end of a first housing portion of the tracking attachment with a distal end of the oral care implement, the first housing portion comprising a first portion of a receiving cavity; inserting the distal end of the oral care implement through the first opening in the first end of the first housing portion and into the first portion of the receiving cavity and translating the first housing portion in a first direction towards a proximal end of the oral care implement until the first housing portion is prevented from further translation in the first direction due to contact between the first housing portion and the oral care implement; and detachably coupling a second housing portion to the first housing portion to close the first opening in the first end of the first housing portion, the first and second housing portions collectively forming a housing that defines the receiving cavity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6A is a top perspective view of a second housing portion of the tracking attachment of the oral care system of FIG. 1 in accordance with an embodiment of the present invention;

FIG. 6B is a bottom perspective view of the second housing of FIG. 6A;

FIG. 6C is a top view of the second housing of FIG. 6A;

DETAILED DESCRIPTION

Figure 1:
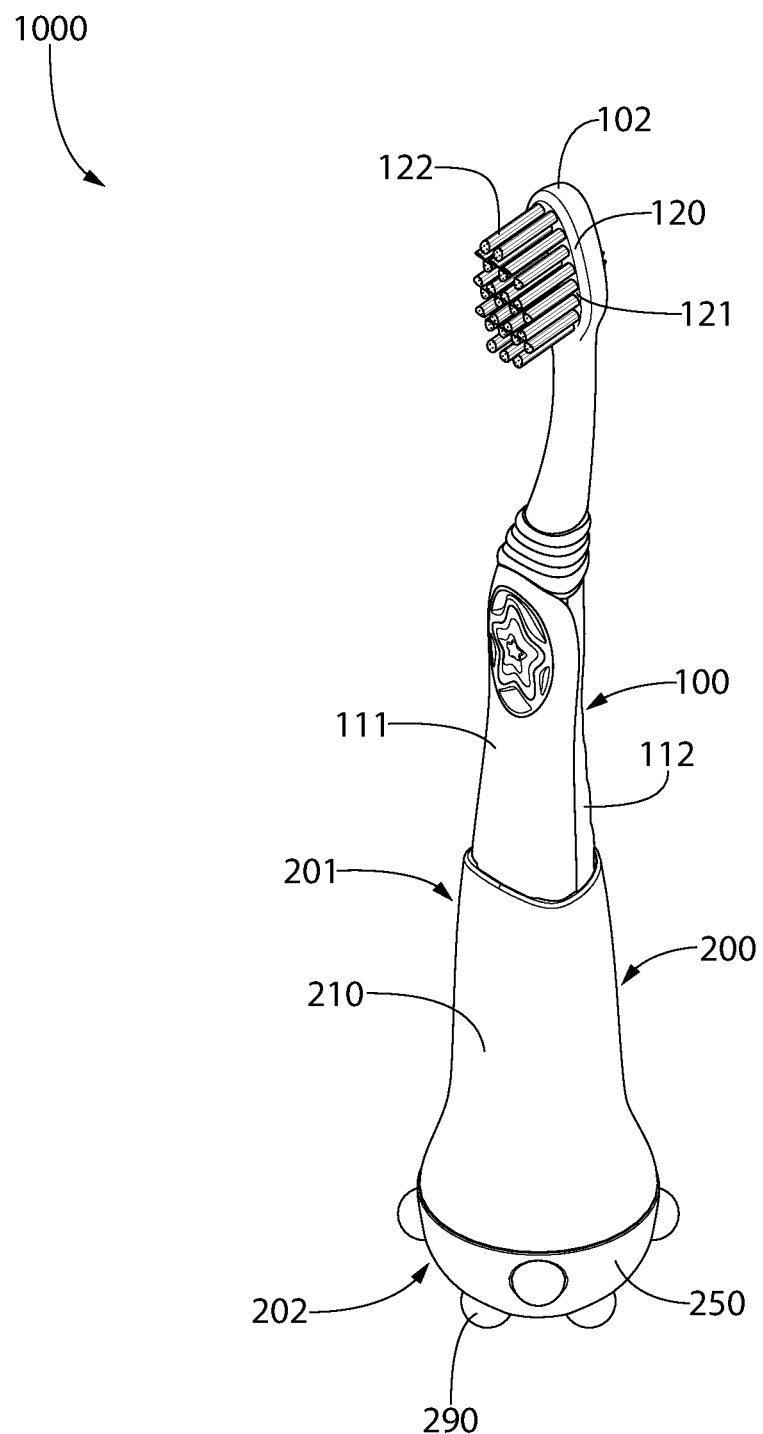
FIG. 1 is a front perspective view of an oral care system that includes an oral care implement and a tracking attachment coupled thereto in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

Referring to FIGS. 1-4, an oral care system 1000 will be described in accordance with an embodiment of the present invention. The oral care system 1000 generally comprises an oral care implement 100 and a tracking attachment 200 that is detachably coupled to the oral care implement 100. The tracking attachment 200 may be configured, by itself or in conjunction with an external electronic device such as a camera, a processor, a memory device, and software and/or algorithms, to track the position, orientation, movement, location in the oral cavity, or the like of the oral care implement 100 to which it is attached. In some embodiments, the invention may be directed to the tracking attachment 200 itself, without the oral care implement 100 being a feature of the invention. In still other embodiments, the invention may be directed to a method of assembling the oral care system 1000 by coupling the tracking attachment 200 to the oral care implement 100.

The tracking attachment 200 comprises a tracking unit 202 that is configured to track at least one of a position, orientation, movement, location in the oral cavity, or the like of the oral care implement to which the tracking attachment 200 is attached. In the exemplified embodiment, the tracking unit 202 comprises a plurality of visual markers that are viewed by a camera to perform the tracking function. However, the invention is not to be so limited and in other embodiments the tracking unit 202 may comprise an accelerometer, a gyroscope, sensors, or other electronic components that facilitate the position, orientation, movement, or location tracking function. In still other embodiments, the tracking unit 202 may include both visual markers as described herein as well as one or more of an accelerometer, gyroscope, or other sensors.

In the exemplified embodiment, the oral care implement 100 is in the form of a manual toothbrush. However, in certain other embodiments the oral care implement 100 can take on other forms such as being a powered toothbrush (having a vibrating or otherwise moving head/cleaning element section), a tongue scraper, a gum and soft tissue cleanser, a water pick, an interdental device, a tooth polisher, a specially designed ansate implement having tooth engaging elements or any other type of implement that is commonly used for oral care. Furthermore, although described herein as being an oral care implement, the inventive device may also be a personal care implement such that it is an implement used for personal care but not necessarily for oral care, such as a razor, a hairbrush, a makeup applicator, or the like. Thus, it is to be understood that the inventive concepts discussed herein can be applied to any type of oral care implement or personal care implement unless a specific type of oral care implement or personal care implement is specified in the claims.

The oral care implement 100 extends from a proximal end 101 to a distal end 102 along a longitudinal axis A-A. The oral care implement 100 includes a handle 110 that is typically gripped by a user during oral hygiene activities and a head 120 that includes features that perform the oral hygiene activities. The handle 110 includes the proximal end 101 of the oral care implement 100 and the head 120 includes the distal end 102 of the oral care implement 100.

As noted above, the handle 110 is the portion of the oral care implement 100 that is typically gripped by a user during oral hygiene activities such as toothbrushing. Thus, the handle 110 is an elongated structure that provides the mechanism by which the user can hold and manipulate the oral care implement 100 during use. In the exemplified embodiment, the handle 110 is generically depicted having various contours for user comfort. In the exemplified embodiment, the handle 110 is formed of a rigid plastic material, such as for example without limitation polymers and copolymers of ethylene, propylene, butadiene, vinyl compounds and polyesters such as polyethylene terephthalate. More specifically, in the exemplified embodiment the handle 110 includes a base portion 111 formed of a rigid plastic material such as polypropylene and a resilient grip component 112 covering portions of the base portion 111 to aid in the comfort to a user. The resilient grip component 112 may be formed from a thermoplastic elastomer or the like.

The oral care implement 100 includes a protrusion 114 (i.e., an alignment feature) that interacts/mates with a portion of the tracking attachment 200 to assist in securing the tracking attachment 200 to the oral care implement 100 and preventing relative axial and rotational movement therebetween when the tracking attachment 200 is coupled to the oral care implement 100. In the exemplified embodiment, the protrusion 114 is formed integrally with the resilient grip component 112, and thus the protrusion 114 is formed from the resilient material such as thermoplastic elastomer. Of course, the invention is not to be so limited and in other embodiments it may be possible for the protrusion 114 to be formed from the more rigid material of the base portion 111 of the handle 110. Moreover, in still other embodiments the protrusion 114 may be omitted.

In the exemplified embodiment, the oral care implement 100 includes a flexible support element 115 that forms the proximal end 101 of the handle 110. The flexible support element 115, which may take the form of a suction cup, may be formed integrally with the resilient grip component 112, or it may be formed separately from the resilient grip component 112. Either way, the flexible support element 115 may be formed of a resilient material such as a thermoplastic elastomer. The flexible support element 115 may be configured to support the oral care implement 100 on a horizontal surface, such as a countertop or the like, in a vertical orientation. As can be seen (perhaps best in FIG. 12), the flexible support element 115 is wider, in a direction transverse to the longitudinal axis A-A, than the rigid base portion 111 of the handle 110 at the location where the flexible support element 115 connects to the rigid base portion 111. This will be discussed further below when discussing the method of coupling the tracking attachment 200 to the oral care implement 100.

The base portion 111 of the handle 110 is formed integrally with the head 120, and thus the head 120 is also formed from a rigid plastic material such as polypropylene. Thus, in the exemplified embodiment, the head 120 is formed integrally with the handle 110 as a single unitary structure using a molding, milling, machining or other suitable process. However, in other embodiments the handle 110 and the head 120 may be formed as separate components which are operably connected at a later stage of the manufacturing process by any suitable technique known in the art, including without limitation thermal or ultrasonic welding, a tight-fit assembly, a coupling sleeve, threaded engagement, adhesion, or fasteners.

The head 120 has a front surface 121 from which tooth cleaning elements 122 extend. Although in the exemplified embodiment all of the tooth cleaning elements 122 appear to be the same in terms of material, structure, shape, and length, the invention is not to be so limited in all embodiments. Thus, the exact structure, pattern, orientation and material of the tooth cleaning elements 122 is not to be limiting of the present invention unless so specified in the claims. Thus, as used herein the term "tooth cleaning elements" is used in a generic sense to refer to any structure that can be used to clean, polish or wipe the teeth and/or soft oral tissue (e.g. tongue, cheek, gums, etc.) through relative surface contact. Common examples of "tooth cleaning elements" include, without limitation, bristle tufts, filament bristles, fiber bristles, nylon bristles, multi-component bristles including spiral bristles and core-sheath bristles, rubber bristles, elastomeric protrusions, flexible polymer protrusions, combinations thereof and/or structures containing such materials or combinations. Suitable elastomeric materials include any biocompatible resilient material suitable for uses in an oral hygiene apparatus. To provide optimum comfort as well as cleaning benefits, the elastomeric material of the tooth or soft tissue engaging elements has a hardness property in the range of A8 to A25 Shore hardness. One suitable elastomeric material is styrene-ethylene/butylene-styrene block copolymer (SEBS) manufactured by GLS Corporation. Nevertheless, SEBS material from other manufacturers or other materials within and outside the noted hardness range could be used.

The tooth cleaning elements 122 of the present invention can be connected to the head 120 in any manner known in the art. For example, staples/anchors, in-mold tufting (IMT) or anchor free tufting (AFT) could be used to mount the cleaning elements/tooth engaging elements. In certain embodiments, the invention can be practiced with various combinations of stapled, IMT or AFT bristles. In AFT, a plate or membrane is secured to the brush head such as by ultrasonic welding. The bristles extend through the plate or membrane. The free ends of the bristles on one side of the plate or membrane perform the cleaning function. The ends of the bristles on the other side of the plate or membrane are melted together by heat to be anchored in place. Any suitable form of cleaning elements may be used in the broad practice of this invention. Alternatively, the bristles could be mounted to tuft blocks or sections by extending through suitable openings in the tuft blocks so that the base of the bristles is mounted within or below the tuft block.

The tracking attachment 200 is coupled to the oral care implement 100, as noted above. In the exemplified embodiment, the tracking attachment 200 is merely structural and does not include any electrical components. Thus, the tracking attachment 200 is free of a power source, battery, processor, controller, sensors, electrodes, chips, printed circuit boards, circuits, resistors, capacitors, inductors, transistors, transformers, switches, fuses, conductors, or any other type of device that may be considered an electrical component. Rather, the tracking attachment 200 is formed entirely of non-electrical components, and the tracking attachment 200 also does not house any electrical components (although in some embodiments the oral care implement 100 may be powered and therefore house electrical components). However, even in such a situation the electrical components do not form any part of the tracking attachment 200, which remains free of any type of electrical component. Of course, alternative embodiments are possible where the tracking attachment 200 may include electrical components such as any of one or more of the components noted above or in particular an accelerometer, gyroscope, or the like.

Although in the exemplified embodiment the tracking attachment 200 is free of electrical components, in some embodiments the tracking attachment 200 could include visual markers that assist in the tracking (described in more detail below). Such visual markers may be lights, such as light emitting diodes, or the like. In such embodiments, the tracking attachment 200 may include electrical components.

The tracking attachment 200 is configured to operate to track characteristics of the oral care implement 100 to which it is attached related to its movement. The tracking attachment 200 is capable of doing this despite being free of electrical components in the exemplified embodiment. When the tracking attachment 200 is attached to the oral care implement and used in conjunction with a camera and specifically formulated software and algorithms, the tracking attachment 200 assists in tracking the movement, position, orientation, or the like of the oral care implement 100 to which it is attached. Specifically, one or more external electronic devices that include a camera, a processor, a memory device, and the required software and algorithms can track movement of the oral care implement 100 based on the location of various visual markers (described below) that form a part of the tracking unit 202 of the tracking attachment 200. The structural features of the tracking attachment 200 will be described in detail herein. However, the algorithms, software, and processors that are used to track movement of the oral care implement based on the visual markers of the tracking attachment 200 will not be described in any great detail herein because that is not the focus of this invention. In one embodiment, the algorithms, software, and processing that occurs is similar to that which is described in U.S. Provisional Patent Application Ser. No. 62/611,112, filed Dec. 28, 2017, the entirety of which is incorporated herein by reference.

The tracking attachment 200 comprises a housing 201 and the tracking unit 202. The housing 201 defines a receiving cavity having a closed bottom end and an open top end. In the exemplified embodiment, the housing 201 comprises a first housing portion 210 and a second housing portion 250 that are detachably coupled together. Portions of the receiving cavity are formed by each of the first and second housing portions 210, 250 such that the receiving cavity is formed when the first and second housing portions 210, 250 are coupled together. In certain embodiments as described herein, the first housing portion 210 forms a first component of the tracking attachment 200 and the second housing portion 250 and the tracking unit 202 collectively form a second component of the tracking attachment. Thus, in some embodiments the tracking unit 202 is coupled to the second housing portion 250. In some embodiments, the tracking unit 202 may be integrated into the housing 201, and more specifically integrated into the second housing portion 250. However, the invention is not to be so limited in all embodiments and the tracking unit 202 may alternatively be coupled to the first housing portion 210 or the tracking unit 202 may be separate from the first and second housing portions 210, 250.

Figure 2:
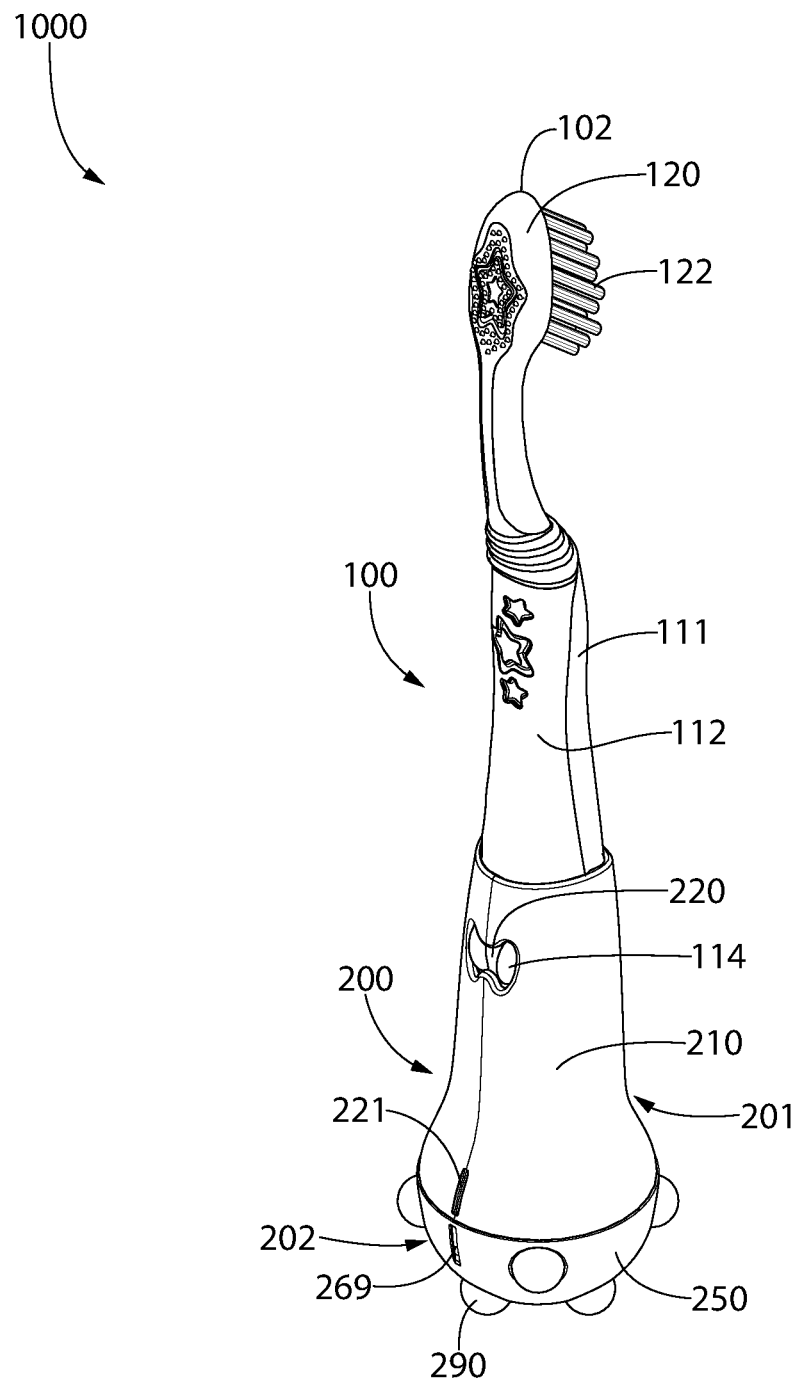
FIG. 2 is a rear perspective view of the oral care system of FIG. 1.
Figure 3:
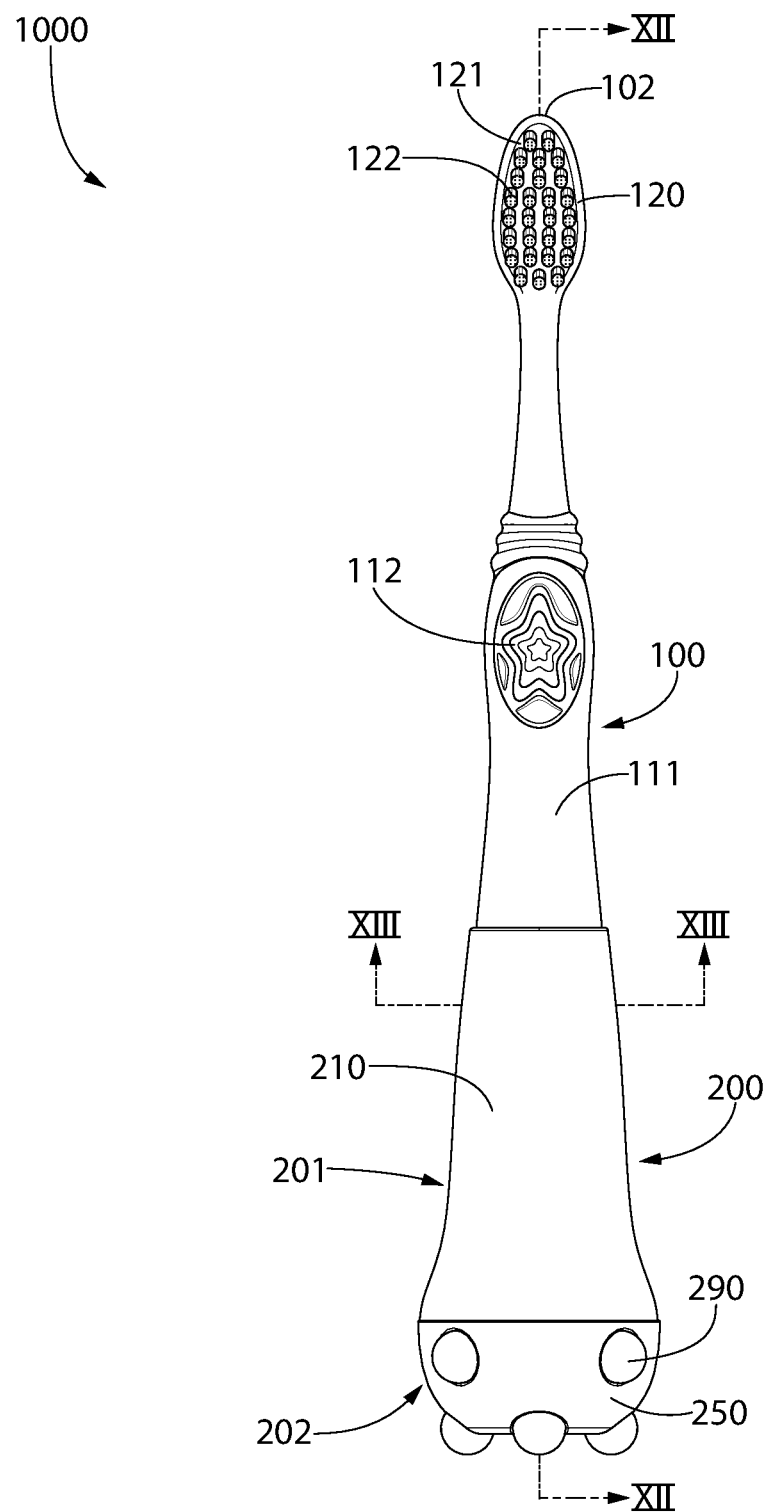
FIG. 3 is a front view of the oral care system of FIG. 1.
Figure 4:
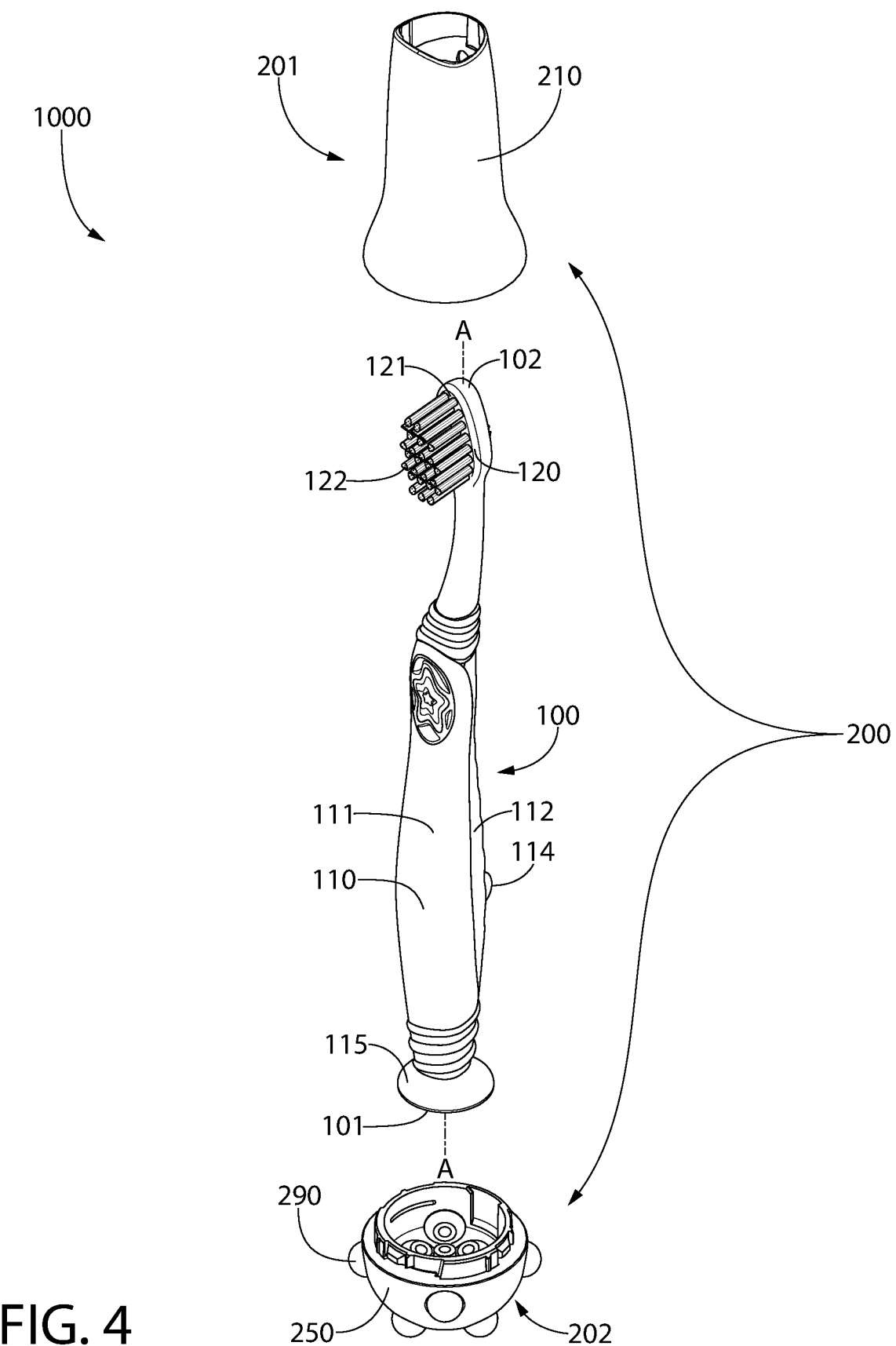
FIG. 4 is a front perspective exploded view of the oral care system of FIG. 1.

In the exemplified embodiment, the first and second housing portions 210, 250 are alterable between: (1) an attached state, as shown in FIGS. 1-3, wherein the first and second housing portions 210, 220 are coupled together to form the housing 201 having a receiving cavity that holds a portion of the handle 110 of the oral care implement 100; and (2) a detached state, as shown in FIG. 4, wherein the first and second housing portions 210, 250 are separate from one another and from the oral care implement 100. The tracking attachment 200 can be readily coupled to and decoupled from the oral care implement 100. As a result, the same tracking attachment 200 can be used with multiple different oral care implements 100 that belong to either the same user (for example, when the user needs to replace his/her oral care implement) or different users (for example, members of a family who live together may share the tracking attachment 200). The tracking attachment 200 is not inserted into a user's mouth but rather is held in a user's hand, and thus the tracking attachment 200 will not spread germs when used by multiple users.

Turning to FIGS. 5A-5D, the first housing portion 210 of the housing 201 of the tracking attachment 200 will be described in detail. The first housing portion 210 extends from a first end 211 to a second end 212 along an axis B-B. In the exemplified embodiment, the first housing portion 210 is formed from a rigid material. Such rigid materials may include hard plastics such as acrylonitrile butadiene styrene or any of the materials noted above for forming the handle 110. As will be appreciated from the description below, the first housing portion 210 generally forms a sleeve that circumferentially surrounds a portion of the oral care implement 100 with other portions of the oral care implement 100 protruding from both of the first and second ends 211, 212 of the first housing portion 210. This will be discussed and described in greater detail below.

Figure 5A:
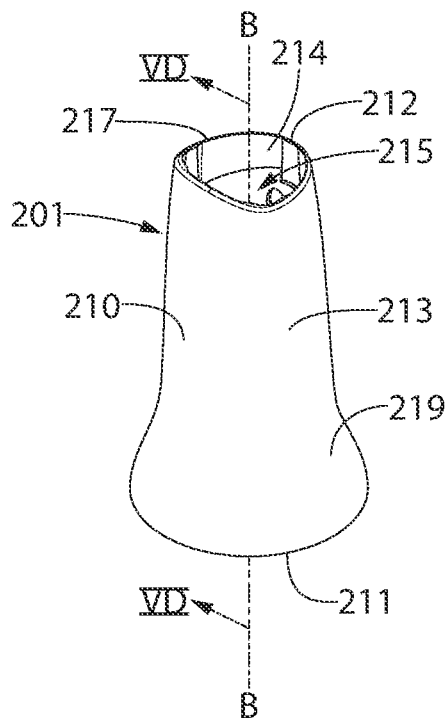
FIG. 5A is a front perspective view of a first housing portion of the tracking attachment of the oral care system of FIG. 1 in accordance with an embodiment of the present invention.
Figure 5B:
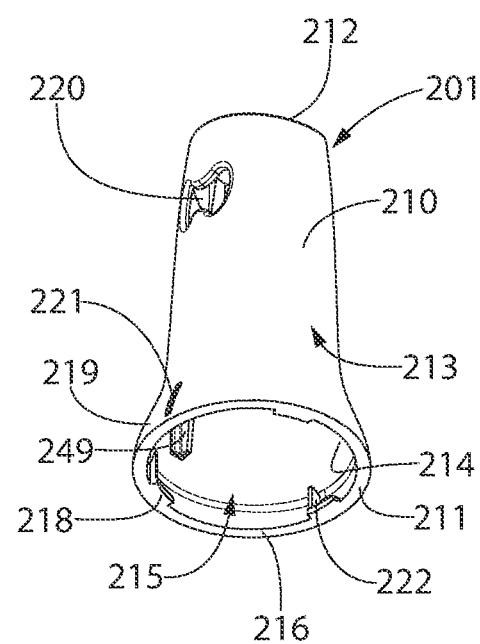
FIG. 5B is a rear perspective view of the first component of FIG. 5A.
Figure 5C:
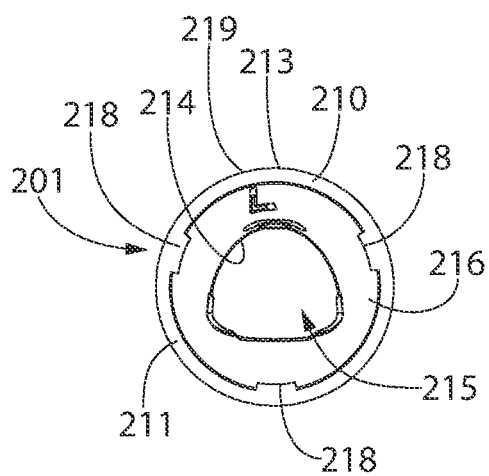
FIG. 5C is a bottom view of the first component of FIG. 5A.
Figure 5D:
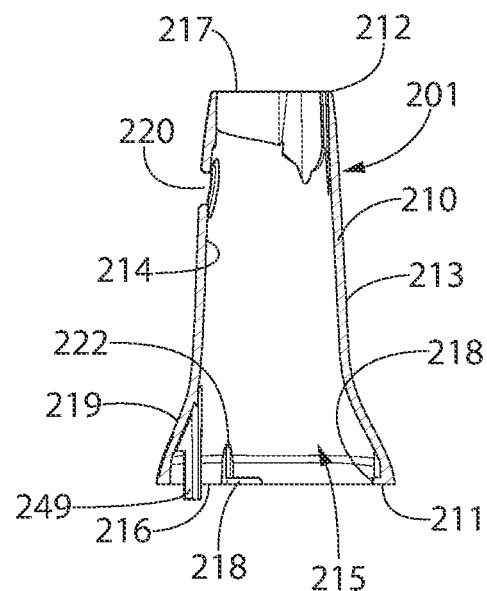
FIG. 5D is a cross-sectional view taken along line VD-VD of FIG. 5A.
Figure 6D:
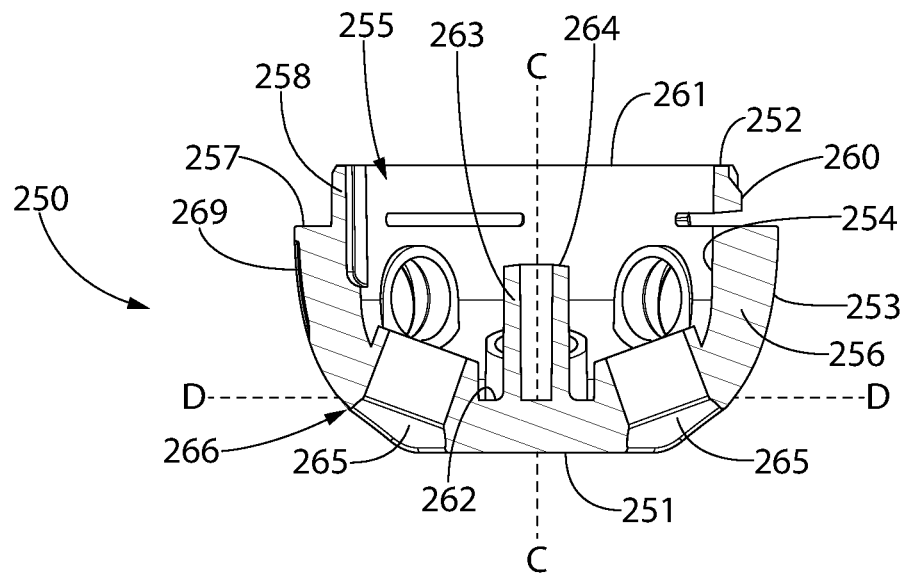
FIG. 6D is a cross-sectional view taken along line VID-VID of FIG. 6C.
Figure 6E:
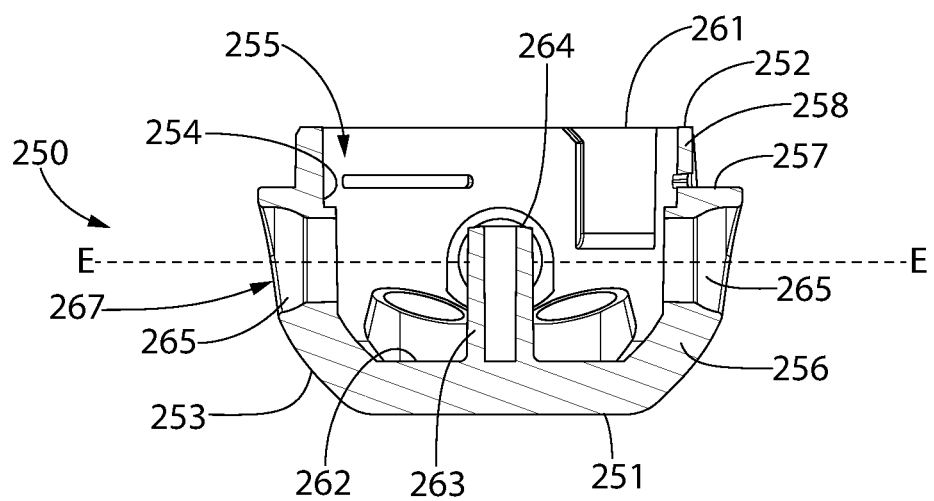
FIG. 6E is a cross-sectional view taken along line VIE-VIE of FIG. 6C.

The first housing portion 210 has an outer surface 213 and an inner surface 214, the inner surface 214 defining a first portion of the receiving cavity 215. The first housing portion 210 includes a first opening 216 at the first end 211 and a second opening 217 at the second end 212. Thus, the first portion of the receiving cavity 215 is open at both of the first and second ends 211, 212 of the first housing portion 210. In the exemplified embodiment, the first portion of the receiving cavity 215 (or at least a portion thereof) is generally in the shape of a Reuleaux triangle (or a rounded triangle), as best seen in FIG. 5C. However, the invention is not to be so limited and the shape of the first portion of the receiving cavity 215 may be modified as desired or needed to facilitate a proper coupling of the first housing portion 210 to the oral care implement 100, whether it be by interference fit as described here or other means. Thus, the first portion of the receiving cavity 215 may be circular, square, triangular, or the like as desired.

The first housing portion 210 comprises a first connection element 218 that facilitates coupling of the first housing portion 210 to the second housing portion 250, described in more detail below. In the exemplified embodiment, the first connection element 218 comprises a plurality of tabs that extend inward from the inner surface 214 of the first housing portion 210 into the first portion of the receiving cavity 215 at the first end 211 of the first housing portion 210. The plurality of tabs are circumferentially spaced apart from one another and engage similar tabs on the second housing portion 250 to facilitate the attachment of the first housing portion 210 to the second housing portion 250, as described in more detail below.

The first housing portion 210 also comprises a locking protuberance 222 adjacent to one end of the first connection element 218. The locking protuberance 222 protrudes from the inner surface 214 of the first housing portion 210 and extends from each of the tabs of the first connection element 218 in a direction away from the first end 211 of the first housing portion 210. During coupling of the first housing portion 210 to the second housing portion 250, the locking protuberance 222 passes over a locking protuberance of the second housing portion 250 to lock the first and second housing portions 210, 250 together in a coupled state. As the locking protuberance 222 passes over the locking protuberances of the second housing portion 250 (discussed in more detail below), an audible clicking sound can be heard, letting the user know that the two housing portions have been adequately locked together.

In the exemplified embodiment, the first portion of the receiving cavity 215 has a transverse cross-sectional area that decreases with distance from the first end 211 of the first housing portion 210 to the second end 212 of the first housing portion 210. Stated another way, the first portion of the receiving cavity 215 tapers from the first end 211 of the first housing portion 210 to the second end 212 of the first housing portion 210. In the exemplified embodiment, the decrease in the transverse cross-sectional area is continuous from the first end 211 to the second end 212, although this is not required in all embodiments. Specifically, in some other embodiments the first portion of the receiving cavity 215 may be tapered in some regions and non-tapered in other regions. In the exemplified embodiment the first portion of the receiving cavity 215 has a minimum cross-sectional area at the second end 212 of the first housing portion 210. Thus, the second opening 217 at the second end 212 of the first housing portion 210 has a smaller transverse cross-sectional area than the first opening 216 at the first end 211 of the first housing portion 210. As will be described below, this facilitates the attachment between the first housing portion 210 and the oral care implement 100 using an interference-type fit. The first housing portion 210 has a flared portion 219 that terminates at the first end 211. The slope of the inner surface 214 of the first housing portion 210 is greater along the flared portion 219 than along the remainder of the first housing portion 210. The flared portion 219 facilitates the making of a flush connection between the first and second housing portions 210, 250 as discussed more fully below.

Additionally, the first housing portion 210 comprises an alignment post 249 that extends downwardly from the inner surface 214 and protrudes or sticks out past the first end 211 of the first housing portion 210. The alignment post 249 extends in a direction parallel to the axis B-B, although this is not required in all embodiments. The alignment post 249 ensures that the first and second housing portions 210 are properly angularly aligned when coupled together. Specifically, the alignment post 249 interacts with an alignment recess in the second housing 250 (described below) so that the first and second housing portions 210, 250 can only be coupled together in a single angular alignment relative to one another. This may be necessary to ensure that visual markers 290 (described below) are in a specific position relative to the tooth cleaning elements 122 to enable accurate tracking of a user's toothbrushing movements. In the exemplified embodiment, the alignment post 249 is an L-shaped post. However, the invention is not to be so limited in all embodiments and the alignment post 249 may have other transverse cross-sectional shapes in other embodiments without affecting its function in the alignment of the first and second housing portions 210, 250.

Figure 13:
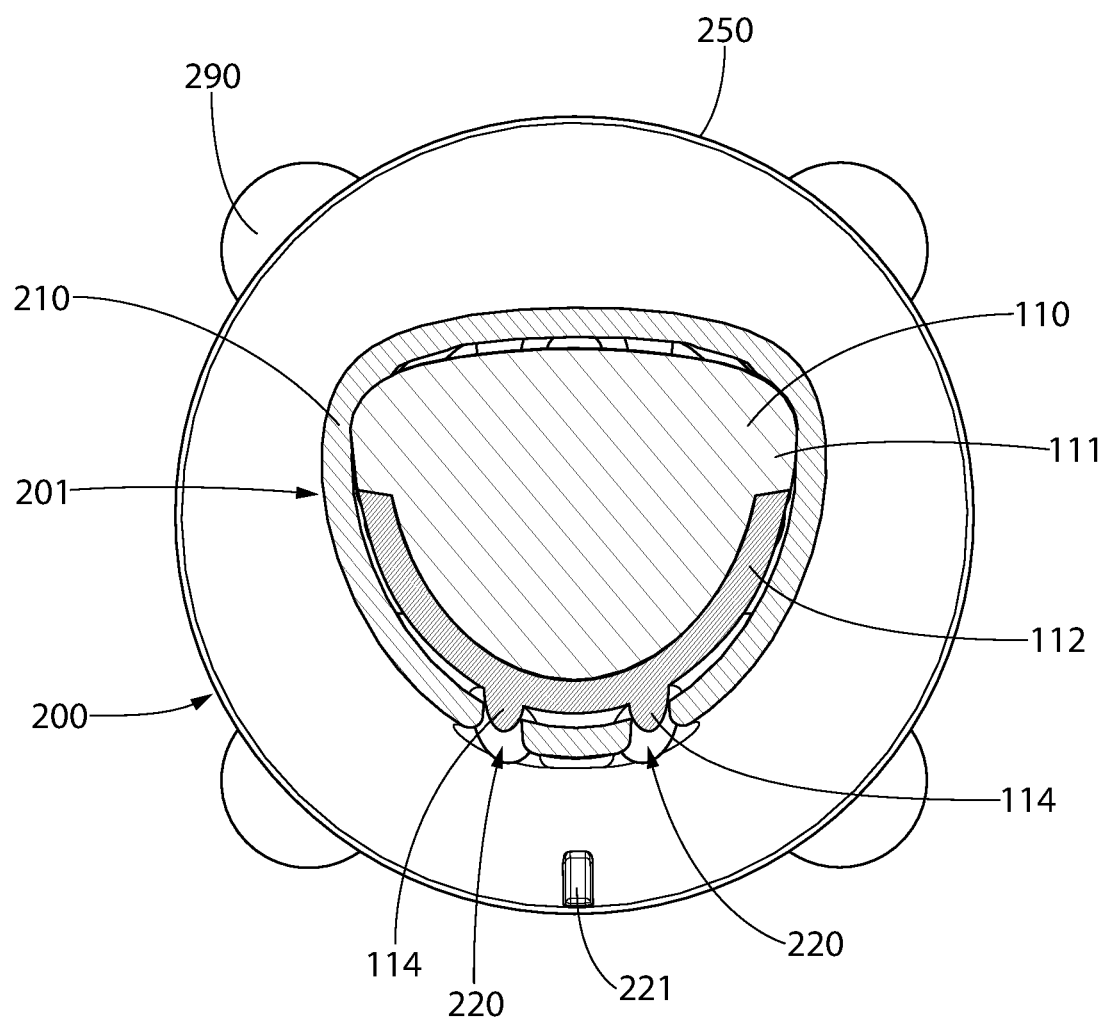
FIG. 13 is a cross-sectional view taken along line XIII-XIII of FIG. 3.

The first housing portion 210 also comprises an alignment feature 220 that is configured to interact with a feature (such as the protrusion 114) on the handle 110 of the oral care implement 100 to prevent relative rotation between the oral care implement 100 and the first housing portion 210. More specifically, in the exemplified embodiment the alignment feature 220 is an aperture that extends through the first housing portion 210 from the inner surface 214 to the outer surface 213 in a direction transverse to the axis B-B. In the exemplified embodiment, the aperture of the alignment feature 220 has the shape of a horizontally oriented numeral eight. However, the invention is not to be so limited and the shape of the aperture may be modified to be any shape so long as it mates with the protrusion 114 on the handle 110. The aperture is located along the wall of the first housing portion 210 in a location that allows the protrusion 114 on the handle 110 to extend into the aperture when the tracking attachment 200 is coupled to the oral care implement 100. Thus, the interaction between the protrusion 114 of the handle 110 and the aperture/alignment feature 220 prohibits relative axial and rotational movement between the oral care implement 100 and the tracking attachment 200 when they are suitably coupled together. The interaction/positioning of the protrusion 114 of the handle 110 and the aperture/ alignment feature 220 of the first housing portion 210 of the tracking attachment 200 is best seen in FIG. 13.

In certain embodiments, the protrusion 114 of the handle 110 and the aperture 220 of the first housing portion 210 of the tracking attachment 200 function as an anti-rotation feature. Specifically, the protrusion 114 of the handle 110 may be a first anti-rotation feature and the aperture 220 of the tracking module 200 may be a second anti-rotation feature such that interaction/mating between the first and second anti-rotation features prevents the tracking attachment 200 from rotating relative to the handle 110. Moreover, in some embodiments these anti-rotation features prohibit the tracking module 200 from being coupled to the handle 110 in anything other than a single orientation. Specifically, due to the first and second anti-rotation features, the tracking module 200 may only be able to be coupled to the handle 110 when it is in one very specific angular orientation relative to the handle 110. This may be important in some embodiments because it may be important for visual markers (described below and denoted as numeral 290) to be positioned at specific locations relative to the head 120 and tooth cleaning elements 122 to ensure that these visual markers are properly read by a camera for position, orientation, and movement tracking during use of the oral care implement, as described above.

In other embodiments, the first anti-rotation feature may be the cross-sectional shape of the handle 110 and the second anti-rotation feature may be the cross-sectional shape of the receiving cavity of the tracking module 200. Thus, the handle 110 and the cavity may be cross-sectional shapes that only allow for the tracking module 200 to be coupled to the handle 110 in a single orientation relative to the handle 110.

Although in the exemplified embodiment, the alignment feature 220 is an aperture that mates with a protrusion 114 on the handle 110, the invention is not to be so limited in all embodiments. In other embodiments, the tracking attachment 200 and the oral care implement 100 may have any mating features that cooperate to prevent relative axial and rotational movement between the oral care implement 100 and the tracking attachment 200. This can be in the form of mating indents and detents, tabs and notches, recesses and protuberances, magnets, fasteners, hook-and-loop, or the like. Thus, any structural/mechanical features on the tracking attachment 200 and the oral care implement 100 that serve to prevent axial and rotational movement between those two components when attached can serve as the alignment features of those components.

The first housing portion 210 also includes a first visual alignment feature 221 (refer also to FIG. 2). In the exemplified embodiment, the first visual alignment feature 221 is a depression formed into the outer surface 213 of the first housing portion 210 and it is elongated in a direction of the axis B-B. Of course, the invention is not to be so limited and the first visual alignment feature 221 could be a protrusion instead of a depression and it may take on any desired shape and configuration and need not be elongated as shown in all embodiments. The first visual alignment feature 221 assists a user in properly aligning the first and second housings 210, 250 during coupling of those two components.

Referring briefly to FIGS. 1-4, the tracking unit 202 comprises a plurality of visual markers 290. In the exemplified embodiment, the plurality of visual markers 290 are coupled, attached, adhered, or affixed to the second housing portion 250 of the housing 201 of the tracking attachment 200. Of course, as noted above the invention is not to be so limited in all embodiments and the plurality of visual markers 290 could instead, or in addition, be coupled to the first housing portion 210 of the housing 201. Alternatively, the plurality of visual markers 290 could be separate from (and not coupled to) the first and second housing portions 210, 250 of the housing 201. In still another embodiment, the plurality of visual markers 290 could be light sources, such as LEDs or the like, and the various visual markers 290 could emit different colors of light. In other embodiments still, the visual markers 290 may be integrally formed with the housing 201 out of the same material as the housing 201. Specifically, the visual markers 290 could be formed as spherical or otherwise shaped protuberances on the outer surface of the housing 201. In such embodiments, the housing 201 and the visual markers 290 could be formed of a hard plastic material and in other embodiments the housing 201 and the visual markers 290 could be formed from a resilient material like a thermoplastic elastomer. In embodiments where the visual markers 290 are formed integrally with the housing 201, the visual markers 290 may be painted or otherwise colored to provide the visual markers 290 with different colors as may be required for proper operation in the tracking function.

FIGS. 6A-6E, which will now be described herein, illustrate only the second housing portion 250 without the plurality of visual markers 290 coupled thereto. The visual markers 290 will be described in FIGS. 7A-8B and the manner in which the visual markers 290 are coupled to the second housing portion 250 will be described in FIGS. 9A-9C.

The second housing portion 250 may be formed from a rigid material. Such a rigid material may include hard plastics such as acrylonitrile butadiene styrene or any of the materials noted above for forming the handle 110. The second housing portion 250 is generally formed from the same material as the first housing portion 210, although this is not required in all embodiments. In any case, both the first and second housings 210, 250 may be formed from a rigid material. Thus, the housing 201 may be formed from a rigid material. Furthermore, in the exemplified embodiment the visual markers 290 are formed from a resilient material, such as silicone or a thermoplastic elastomer. This will be discussed in more detail below with specific reference to FIGS. 7A-8B. However, in other embodiments the visual markers 290 may be formed from a rigid material such as hard plastics including polypropylene, without affecting their role in the tracking function.

The second housing portion 250 extends from a first end 251 to a second end 252 along an axis C-C. Furthermore, the second housing portion 250 has an outer surface 253 and an inner surface 254, the inner surface 254 defining a second portion of the receiving cavity 255. When the first and second components 201, 202 are coupled together, the first and second cavities 215, 255 collectively form a receiving cavity that holds a portion of the handle 110 of the oral care implement 100.

The second housing portion 250 comprises a main portion 256 having a dome-like or hemispherical shape that extends from the first end 251 to a distal end 257. The second housing portion 250 also comprises a neck portion 258 that extends from the distal end 257 of the main portion 256 to the second end 252 of the second housing portion 250. The second housing portion 250 comprises a second connection element 260 that cooperates with the first connection element 218 of the first housing portion 210 to couple the first and second housings 210, 250 together. In the exemplified embodiment, the second connection element 260 comprises a plurality of tabs extending outwardly from an outer surface of the neck portion 258 of the second housing portion 250 in a circumferentially spaced apart manner. The tabs of the second connection element 260 interact/cooperate with the tabs of the first connection element 218 to couple the first and second housing portions 210, 250 together to form the housing 201, as described further below. Of course, tabs are merely one exemplified embodiment of the first and second connection elements 218, 260 and these elements may take on other forms, such as being mating threads, structures that achieve an interference fit, detents and indents, recesses and protuberances, key and key-hole, fasteners, tabs and notches, or the like.

In addition to the tabs of the second connection element 260, the second housing portion 250 comprises a plurality of locking protuberances 268 such that one of the locking protuberances 268 is adjacent to and slightly spaced apart from each of the tabs of the second connection element 260. The locking protuberances 268 interact with the locking protuberances 222 to lock the first and second housing portions 210, 250 together. Specifically, during coupling of the second housing portion 250 to the first housing portion 210, the second housing portion 250 is rotated relative to the first housing portion 210. During this rotation, the first locking protuberances 222, 268 pass over one another and make an audible clicking sound, which instructs the user that the first and second housing portions 210, 250 are locked together. Once this clicking sound is heard, the locking protuberances 268 of the second housing portion 250 are located within the space/gap between the locking protuberances 222 and the tabs of the connection elements 218 of the first housing portion 210. This engagement prevents the second housing portion 260 from being readily rotated relative to the first housing portion 210 without a user imparting a force sufficient to pass the locking protuberances 222, 268 back over one another. Furthermore, the first and second connection elements (i.e., tabs 218, 260) are in axial alignment, which prevents the first and second housing portions 210, 250 from simply being pulled apart in the axial direction.

In addition, the second housing portion 250 comprises an alignment recess 259 that mates/interacts with the alignment post 249 of the first housing portion 210. Specifically, unless the first and second housing portions 210, 250 are in a specific angular orientation relative to one another, the alignment post 249 will bump against the second housing portion 250 and prevent coupling of the first and second housing portions 210, 250 to one another. Once proper relative angular orientation is achieved between the first and second housing portions 210, 250, the alignment post 249 will enter into the alignment recess 259 and will remain there during the rotation of the second housing portion 250 relative to the first housing portion 210 during coupling of those two housing portions together. Thus, the alignment post 249 and the alignment recess 259 also ensure that the first and second housing portions 210, 250 are in proper angular alignment with one another when coupled together. The alignment post 249 is depicted within the alignment recess 259 in the cut-away view illustrated in FIG. 11.

In the exemplified embodiment, the second end 252 of the second housing portion 250 has an opening 261, and thus the second portion of the receiving cavity 255 is open at the second end 252 of the second housing portion 250. The second portion of the receiving cavity 255 of the second housing portion 250 comprises a floor 262 that closes a bottom end of the second portion of the receiving cavity 255. Furthermore, the second housing portion 250 comprises a support post 263 extending from the floor 262 towards the second end 252, the support post 263 terminating in a distal end 264. The distal end 264 of the support post 263 is recessed relative to the second end 252 of the second housing portion 250, and thus the support post 263 is located entirely within the second portion of the receiving cavity 255. The support post 263, and more specifically the distal end 264 thereof, provides a surface upon which the proximal end 101 of the oral care implement 100 rests when the tracking attachment 200 is coupled to the oral care implement 100. Thus, as described more fully below, the oral care implement 100 extends into the second portion of the receiving cavity 255 of the second housing portion 250 when the tracking attachment 200 is coupled to the oral care implement 100. In the exemplified embodiment, the support post 263 is aligned on and elongated along the axis C-C of the second housing portion 250.

Similar to the first housing portion 210, the second housing portion 250 comprises a second visual alignment feature 269 (see also FIG. 2). In the exemplified embodiment, the second visual alignment feature 269 is a depression formed into the outer surface 253 of the second housing portion 250 and it is elongated in a direction of the axis C-C. Of course, the invention is not to be so limited and the second visual alignment feature 269 could be a protrusion instead of a depression and it may take on any desired shape and configuration and need not be elongated as shown in all embodiments. The second visual alignment feature 269 is merely intended to assist a user in properly aligning the first and second housings 210, 250 by aligning the first and second visual alignment features 221, 269 during coupling of the first and second components 201, 202.

The second housing portion 250 comprises a plurality of holes 265 that extend through the thickness of the second housing portion 250 from the outer surface 253 to the inner surface 254. Thus, each of the holes 265 forms a passageway into the second portion of the receiving cavity 255 from the atmosphere or external environment. The holes 265 are arranged in a spaced apart manner and they include a first set of holes 266 that are aligned along a first plane D-D that is orthogonal to the axis C-C and a second set of holes 267 that are aligned along a second plane E-E that is orthogonal to the axis C-C. The first and second planes D-D, E-E are parallel in the exemplified embodiment. In the exemplified embodiment, each of the first and second sets of holes 266, 267 includes four separate and spaced apart holes, although more or less than four holes may be included within each set of holes 266, 267. The holes 265 provide a location at which the markers 290, described below with reference to FIGS. 7A-8B, are coupled to the second housing portion 250.

Figure 7A:
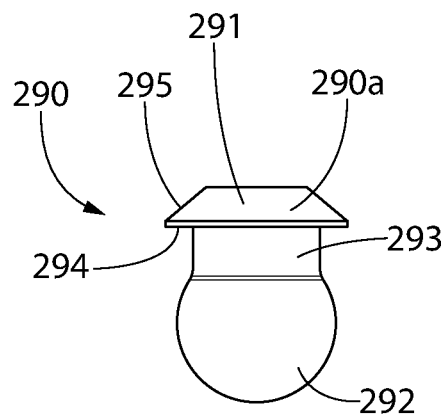
FIGS. 7A and 7B are front and perspective views, respectively, of a first type of visual marker of the tracking attachment.
Figure 7B:
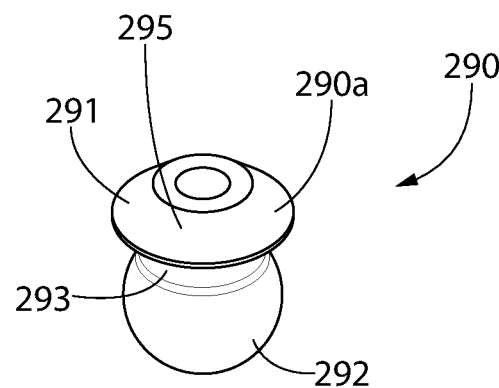
Figure 8A:
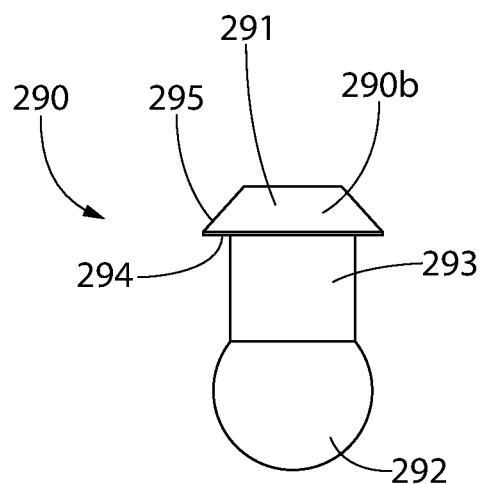
FIGS. 8A and 8B are front and perspective views, respectively, of a second type of visual marker of the tracking attachment.
Figure 8B:
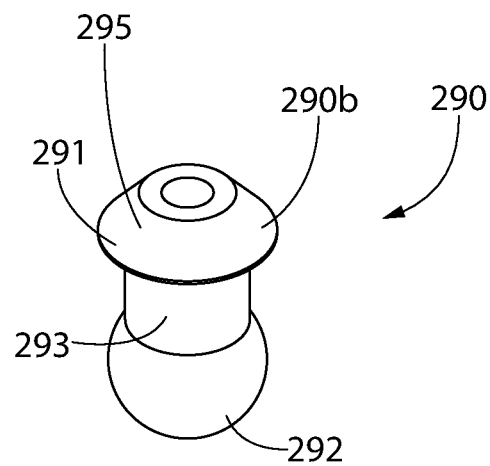

Referring now to FIGS. 7A-8B, the different visual markers 290 will be described. In the exemplified embodiment, here are two types of visual markers 290 including a first type 290a as illustrated in FIGS. 7A and 7B and a second type 290b as illustrated in FIGS. 8A and 8B. Of course, more than two types of visual markers may be provided in other embodiments, and in still other embodiments all of the visual markers 290 may be structurally identical. In the exemplified embodiment, the first and second types 290a, 290b of the visual markers 290 are identical except that the second type 290b is longer than the first type 290a. Otherwise, the structure, shape, and parts thereof are the same. The visual markers 290 of the first type 290a are intended to be coupled to the second housing portion 250 within the second set of holes 267 and the visual markers 290 of the second type 290b are intended to be coupled to the second housing portion 250 within the first set of holes 266. Each of the visual markers 290 of the first type 290a may be a different color from each other and each of the visual markers 290 of the second type 290b may be a different color from each other. In some embodiments for each of the visual markers 290 of the first type 290a, there is a visual marker 290 of the second type 290b that has the same color.

Each of the visual markers 290 comprises an anchor portion 291, a protruding portion 292, and an intermediate portion 293 that extends between the anchor and protruding portions 291, 292. The intermediate portions 293 of the second type 290b of visual markers 290 are longer than the intermediate portions 293 of the first type 290a of visual markers 290, but otherwise the first and second types 290a, 290b are identical as mentioned above. For each of the visual markers 290, a lower surface of the anchor portion 291 forms a shoulder 294 that extends radially at an end of the intermediate portion 293 to facilitate the coupling of the visual markers 290 to the second housing portion 250. Specifically, as described below with reference to FIGS. 9A-9C, the shoulder 294 engages a portion of the second housing portion 250 to secure the visual marker 290 to the second housing portion 250. An upper surface 295 of the anchor portion 291 that extends from the shoulder 294 is chamfered to make it easier to manually couple the visual marker 290 to the second housing portion 250. The protruding portions 292 are dome or bulbous shaped portions that protrude from the outer surface 253 of the second housing 210 when the visual markers 290 are coupled thereto. Stated another way, the protruding portions 292 are spherical or semispherical shaped.

Figure 9A:
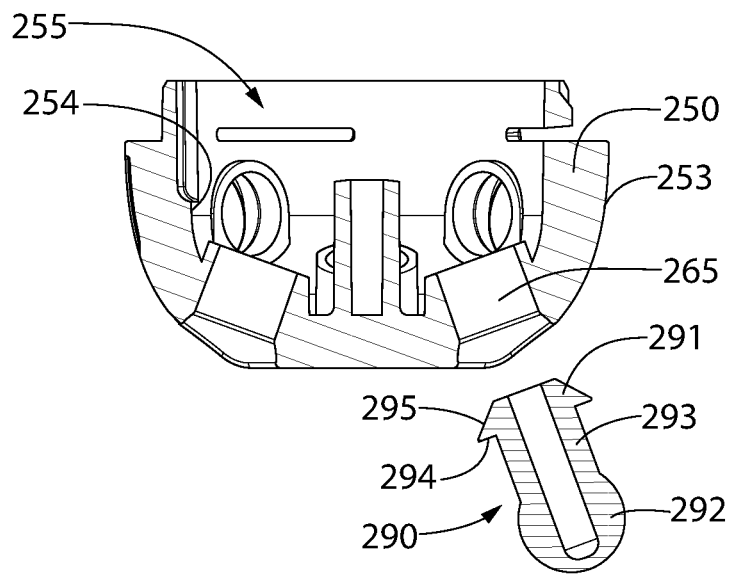
FIGS. 9A-9C schematically illustrate the process of coupling one of the visual markers of FIG. 8A to the second housing portion of the tracking attachment of FIG. 6A, in accordance with an embodiment of the present invention.
Figure 9B:
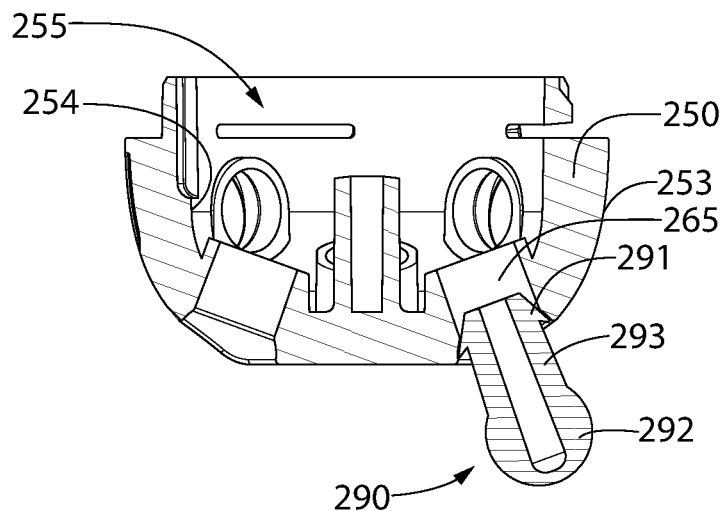
Figure 9C:
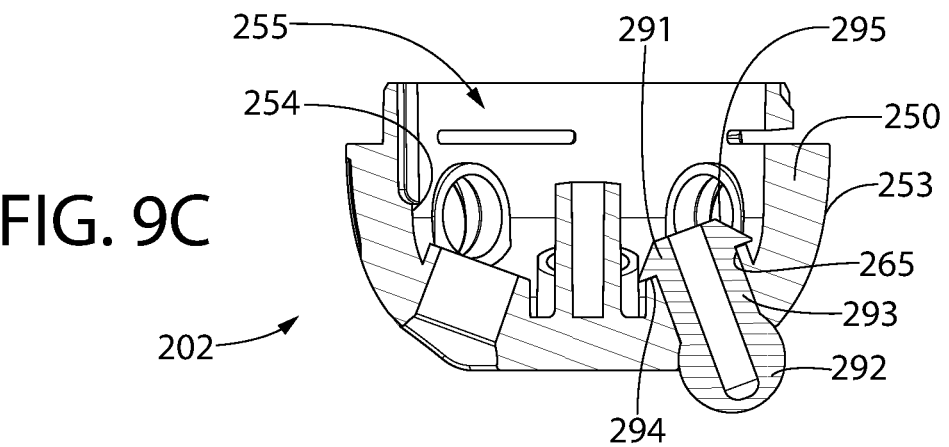

Referring to FIGS. 9A-9C, the manner of coupling the visual markers 290 to the second housing portion 250 will be described in accordance with an exemplary embodiment of the present invention. In the exemplified embodiment, the second housing portion 250 and the visual markers 290 are manufactured separately from one another and then the visual markers 290 are manually (or via an autonomous process using a controller and/or robotic machine) coupled to the second housing portion 250. This process is what will be described with reference to FIGS. 9A-9C. However, in alternative embodiments the visual markers 290 may be formed first and then the second housing portion 250 may be injection molded around the visual markers 290. In still other embodiments, the second housing portion 250 may be formed first and then the visual markers 290 may be injection molded into the openings 265 in the second housing portion 250. Thus, variations in the manner of manufacturing the second housing portion 250 are possible and fall within the scope of the invention claimed herein.

To manually couple the visual markers 290 to the second housing portion 250 in accordance with the exemplified embodiment, one of the visual markers 290 is moved adjacent to one of the holes 265 with the anchor portion 291 of the visual marker 290 closest to the second housing portion 250 and the protruding portion 293 of the visual marker 290 furthest from the second housing portion 250. Next, the anchor portion 291 is inserted into the hole 265 in the second housing portion 250. Because the visual marker 290 is formed from a resilient material such as silicone or a thermoplastic elastomer, the anchor portion 291 of the visual marker 290 will bend and deflect as it rubs against the wall defining the hole 265. The chamfered surface 295 makes this insertion process easier by providing for a greater degree of bending of the anchor portion 291.

The visual marker 290 is continued to be inserted into the hole 265 until the anchor portion 291 is located on the side of the hole 265 that is opposite the outer surface 253 of the second housing portion 250. Stated another way, the visual marker 290 is inserted into the hole 265 until the anchor portion 291 is entirely located within the second portion of the receiving cavity 255 (see FIG. 9C). At this point, the shoulder 294 defined by the lower surface of the anchor portion 291 engages a surface of the second housing portion 250 within which the hole 265 is defined. This engagement prevents the visual marker 290 from being pulled back through the hole 265. Furthermore, contact between the protruding portion 292 of the visual marker 290 and the second housing portion 250 prevents the visual marker 290 from being pressed further into the hole 265. This same process can be used to couple each of the visual markers 290 to the second housing portion 250.

When coupled to the second housing, the anchor portions 291 of the visual markers 290 are located within the second portion of the receiving cavity 255, the intermediate portions 293 of the visual markers 290 are located within one of the plurality of holes 265, and the protruding portions 292 of the visual markers 290 protrude from the outer surface 253 of the second housing portion 250. The protruding portions 292 are dome-shaped (or spherical, semispherical, hemispherical shaped) and thus have a circular-shaped appearance when viewed from the outside of the second housing portion 250.

Of course, the above is merely in accordance with one exemplary embodiment, and the invention is not to be so limited in all embodiments. In alternative embodiments, the holes 265 can be replaced with basins having a floor, and the visual markers 290 may be injected into the basin cavities to couple the visual markers to the second housing portion 250. In such embodiments, the material of the visual markers 290 may chemically bond to the material of the second housing 250 to facilitate the coupling therebetween. In still other embodiments, the second housing 250 may have a basin (or a blind hole) with an annular channel extending from it so that portions of the visual marker 290 may enter into the annular channel to facilitate a proper attachment of the visual markers 290 to the second housing 250. In short, the openings 265 is merely one way that the visual markers 290 may be coupled to the second housing 250, but other manufacturing techniques are possible while still enabling the visual markers 290 to operate and function as the tracking unit 202 as described herein.

Figure 10A:
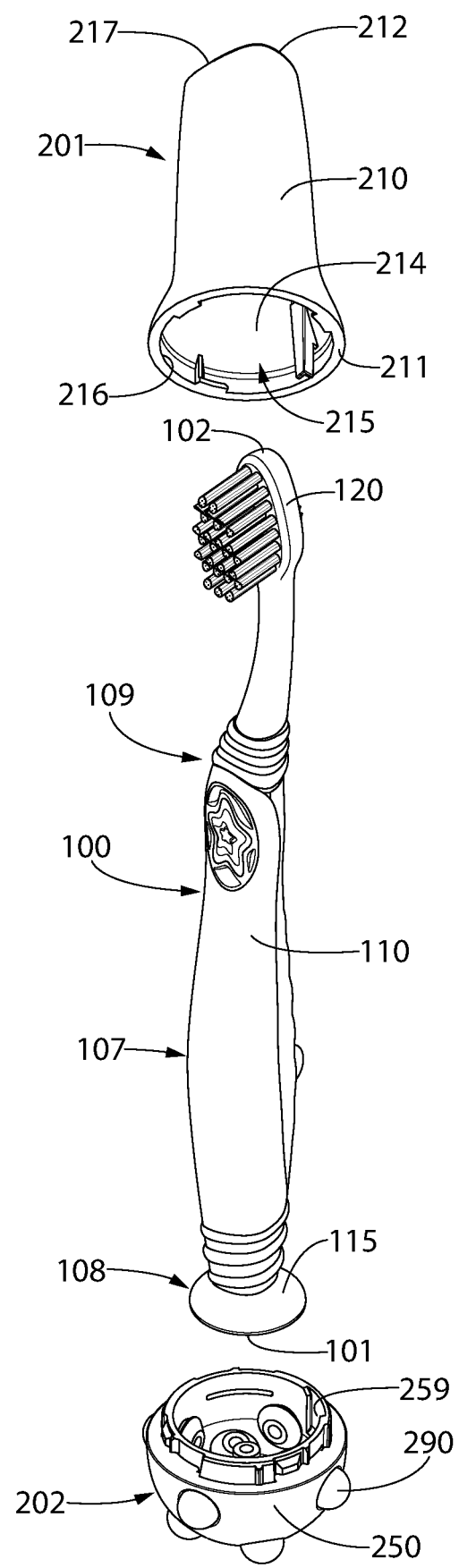
FIGS. 10A-10C illustrate the process of coupling the tracking attachment to the oral care implement, in accordance with an embodiment of the present invention.
Figure 10B:
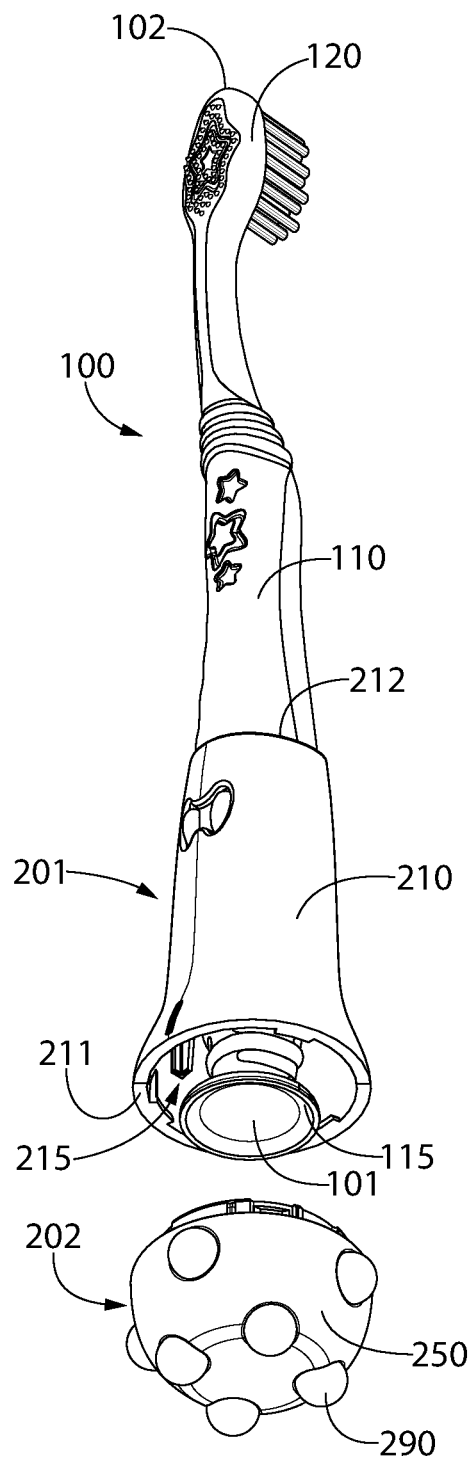
Figure 10C:
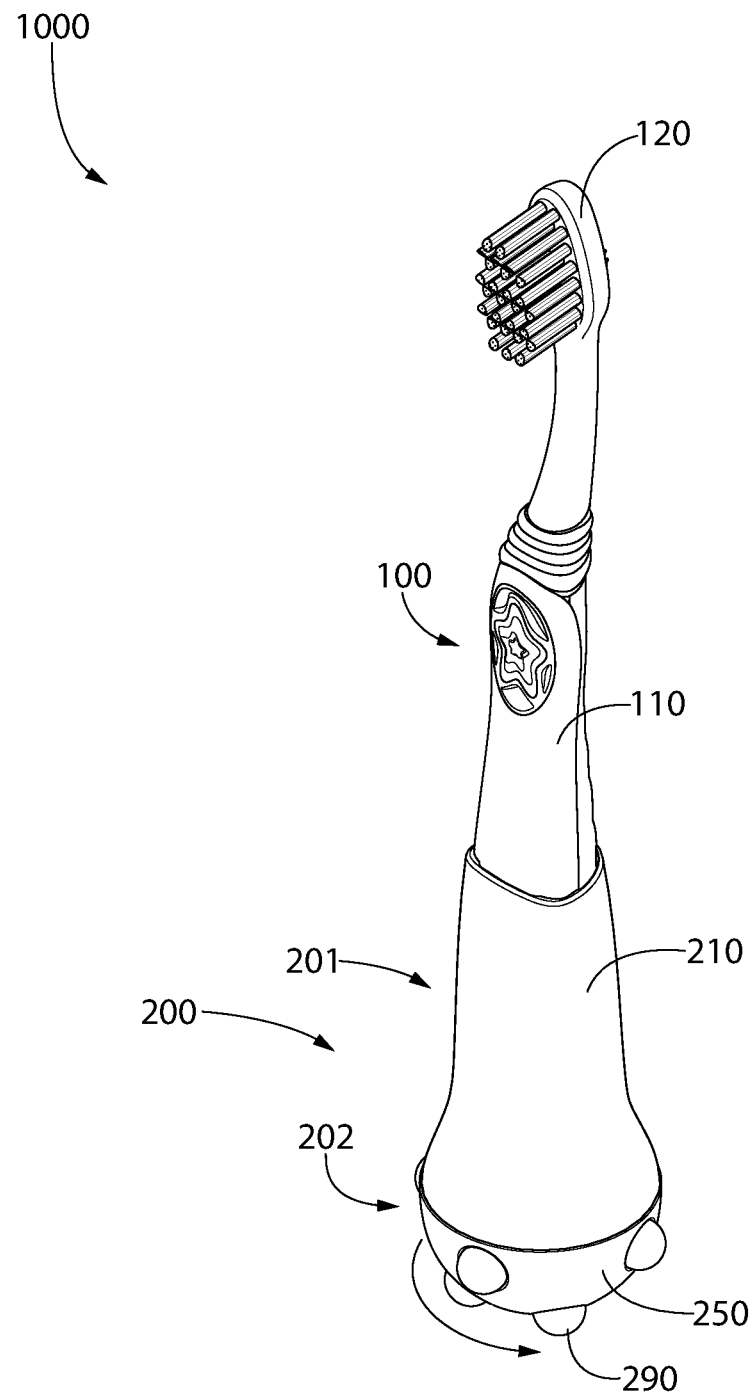

Referring to FIGS. 10A-10C sequentially, the method of assembling the oral care system 1000 by coupling the tracking attachment 200 to the oral care implement 100 will be described in accordance with an embodiment of the present invention. As discussed previously, the first housing portion 210 has a first opening 216 and a second opening 217. When the tracking attachment 200 is coupled to the oral care implement 100, the second end 212 of the first housing portion 210 is located closer to the head 120 and distal end 102 of the oral care implement 100 than the first end 211 of the first housing portion 210. Stated another way, the second end 212 of the first housing portion 210 is located between the first end 211 of the first housing portion 210 and the distal end 102 of the oral care implement 100. The first opening 216 has a larger transverse cross-sectional area than the second opening 217, and thus portions of the oral care implement 100 that cannot fit through the second opening 217 are able to fit through the first opening 216.

Specifically, a proximal portion of the oral care implement 100 has a transverse cross-sectional shape or profile that does not fit through the second opening 217 in the second end 212 of the first housing portion 210. In the exemplified embodiment, the proximal portion of the oral care implement 100 is formed, at least in part, by the flexible support element 115. In some embodiments, the proximal portion of the oral care implement 100 that does not fit through the second opening 217 may be located at the proximal end 101 of the oral care implement 100 whereas in other embodiments the proximal portion of the oral care implement 100, or portion thereof, that does not fit through the second opening 217 may be located at some distance from the proximal end 101 of the oral care implement 100. This distance may be less than one-half the length of the oral care implement 100, more specifically less than one-third the length of the oral care implement 100, still more specifically less than one-fourth, one-fifth, one-sixth, one-seventh, one-eighth, one-ninth, or one-tenth of the length of the oral care implement 100. Thus, the proximal portion is located closer to the proximal end 101 than to the distal end 102, and preferably it is adjacent or near the proximal end 101 if not located immediately at the proximal end 101.

Regardless of whether the portion that does not fix through the opening 217 is located at the proximal end 101 or near it, the second component 201 cannot be coupled to the oral care implement 100 by sliding the first housing portion 210 upwardly along the oral care implement 100 from the proximal end 101 towards the distal end 102 because the proximal portion of the oral care implement 100 cannot fit through the second opening 217. Rather, to couple the first housing portion 210 to the oral care implement 100, the first housing portion 210 is positioned so that the first end 211 of the first housing portion 210 is adjacent to the distal end 102 of the oral care implement 100. Next, the first housing portion 210 is moved downwardly in the axial direction towards the proximal end 101 of the oral care implement 100. During this process, the distal end 102 and the head 120 of the oral care implement 100 passes through the first opening 216, into the first portion of the receiving cavity 215, and then through the second opening 217 so that the first housing portion 210 forms a sleeve over the handle 120 of the oral care implement 100 that circumferentially surrounds a portion of the oral care implement 100. This is possible because the distal end 102 of the oral care implement 100 has a transverse cross-sectional shape or profile that fits through both of the first and second openings 216, 217.

Figure 12:
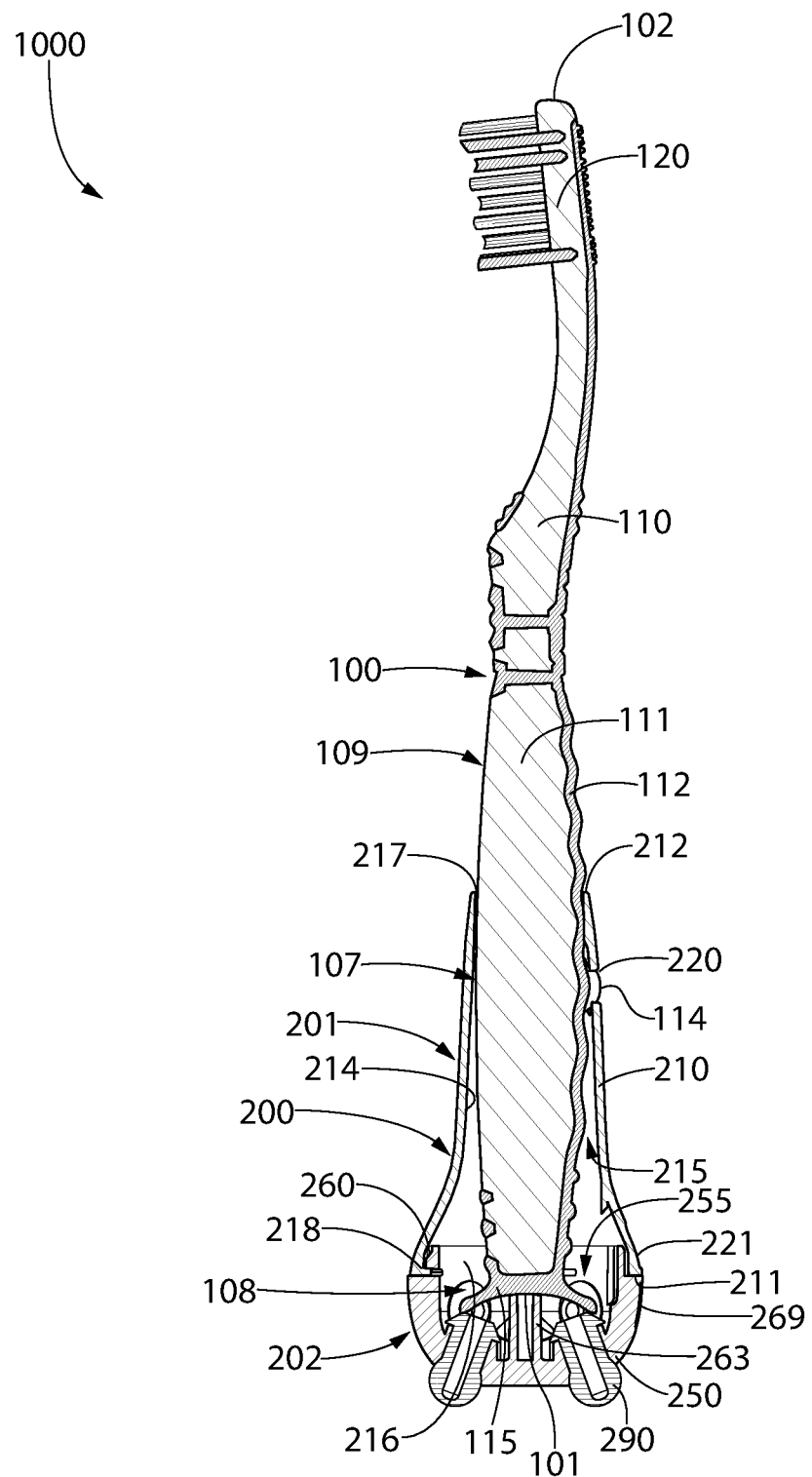
FIG. 12 is a cross-sectional view taken along line XII-XII of FIG. 3.

The first housing portion 210 continues to be moved axially until it is prevented from further axial movement due to an abutment that occurs between the inner surface 214 of the first housing portion 210 and an outer surface of the handle 110 of the oral care implement 100. Specifically, as the smaller transverse cross-sectional area portion of the first portion of the receiving cavity 215 near the second end 212 of the first housing portion 210 moves downwardly along the handle 110, it eventually comes into contact with a portion of the handle 110 that has a transverse cross-sectional area that does not fit through the second opening 217. At this point, the first housing portion 210 can no longer be moved towards the proximal end 101 of the oral care implement 100 because of interference/interaction/contact between the inner surface 214 of the first housing 215 and the outer surface of the oral care implement 100. This is best shown in FIG. 12. The interaction between the protrusion 114 on the handle 110 and the aperture of the alignment feature 220 also helps to lock the tracking module 200 to the oral care implement 100.

Although described herein as being prevented from further movement in the axial direction, it may be possible to continue to move the first housing portion 210 relative to the oral care implement 100 by using an excessive pulling force. This is because a part of the handle 110 of the oral care implement 100 is formed from a resilient material (i.e., the resilient grip component 112) and the resilient material will compress when a force is applied to it. Thus, the word "prevent," as used in this context, does not necessarily mean that it would be impossible to move the first housing portion 210 in the axial direction, but rather that it would be difficult. The user will understand the correct stopping point for movement of the first housing portion 210 relative to the oral care implement 100 when such movement becomes more strained and difficult. For example, if the first housing portion 210 were merely dropped onto the oral care implement 100 from the distal end 102 of the oral care implement 100 with the oral care implement 100 oriented vertically, the stopping point would be the point at which gravity, by itself and without any external forces being applied, can no longer move the first housing portion 210 downwardly along the oral care implement 100

Thus, in some embodiments it may be desirable to simply place the head 120 of the oral care implement 100 into the first portion of the receiving cavity 215 and to then release the first housing portion 210 while holding the oral care implement 100 to allow gravity to move the first housing portion 210 into the proper location relative to the oral care implement 100. Gravity will allow the first housing portion 210 to fall downwardly towards the proximal end 101 of the oral care implement 100 until the contact between the outer surface of the handle 110 of the oral care implement 100 and the inner surface 214 of the first housing portion 210 creates a friction or interference force that exceeds the force of gravity and prevents gravity from moving the first housing portion 210 further. This occurs at least in part due to the tapered shape of the first portion of the receiving cavity 215 of the first housing portion 210. At this point, an additional gentle tug on the first housing portion 210 relative to the oral care implement 100 may be used to secure the first housing portion 210 in place on the oral care implement 100.

At the point where axial movement of the first housing portion 210 relative to the oral care implement 100 in the direction of the proximal end 101 of the oral care implement 100 is prevented (or made more difficult), a first portion 107 of the oral care implement 100 is located within the first portion of the receiving cavity 215 of the first housing portion 210, a second portion 108 of the oral care implement 100 protrudes from the first end 211 of the first housing portion 210 of the first housing portion 210, and a third portion 109 of the oral care implement 100 protrudes from the second end 212 of the first housing portion 210 of the first housing portion 210. The second portion 108 of the oral care implement 100 includes the flexible support member 115, the proximal portion, and the proximal end 101. The third portion 109 of the oral care implement 100 includes the head 120 and the distal end 102. Thus, a portion of the oral care implement 100 is located within the first portion of the receiving cavity 215 of the first housing portion 210 and a portion of the oral care implement 100 protrudes from the first portion of the receiving cavity 215 (and from the first end 211 of the first housing portion 210).

Next, the second housing portion 250 of the tracking attachment 200 is positioned with the second end 252 of the second housing portion 250 adjacent to the proximal end 101 of the oral care implement 100. The second housing portion 250 is moved axially towards the distal end 102 of the oral care implement 100 until the proximal end 101 of the oral care implement 100 passes through the opening 261 of the second housing portion 250 and into the second portion of the receiving cavity 255. The second housing portion 250 is moved until the distal end 257 of the main portion 256 abuts the first end 211 of the first housing portion 210 and the neck portion 258 of the second housing portion 250 extends through the first opening 216 in the first end 211 of the first housing portion 210 and into the first portion of the receiving cavity 215. As noted above, the second housing portion 250 will be in a specific angular orientation relative to the first housing portion 210 because in order to move the second housing portion 250 into abutment with the first housing portion 210, the alignment post 249 must be positioned within the alignment recess 259.

Next, as depicted in FIG. 10C, the second housing portion 250 is rotated relative to the first housing portion 210 to facilitate engagement between the first connection element 218 of the first housing portion 210 and the second connection element 260 of the second housing portion 250. During this rotation, the locking protuberances 222, 268 of the first and second housing portions 210, 250 pass over one another and create an audible clicking sound, thereby informing the user that the first and second housing portions 210, 250 have been locked (in a detachable manner) together. Furthermore, during the rotation of the second housing portion 250 relative to the first housing portion 210, the alignment post 249 of the first housing portion 210 remains located within he alignment recess 259 of the second housing portion 250. As seen in FIG. 10C and FIG. 12, when the first and second housing portions 210, 250 are coupled together to form the housing 201, an outer surface of the first housing portion 210 is flush with an outer surface of the second housing portion 250 so that an outer surface of the housing 201 of the tracking attachment 200, particularly at the interface of the first and second housing components 210, 250, is a smooth, uninterrupted surface.

Figure 11:
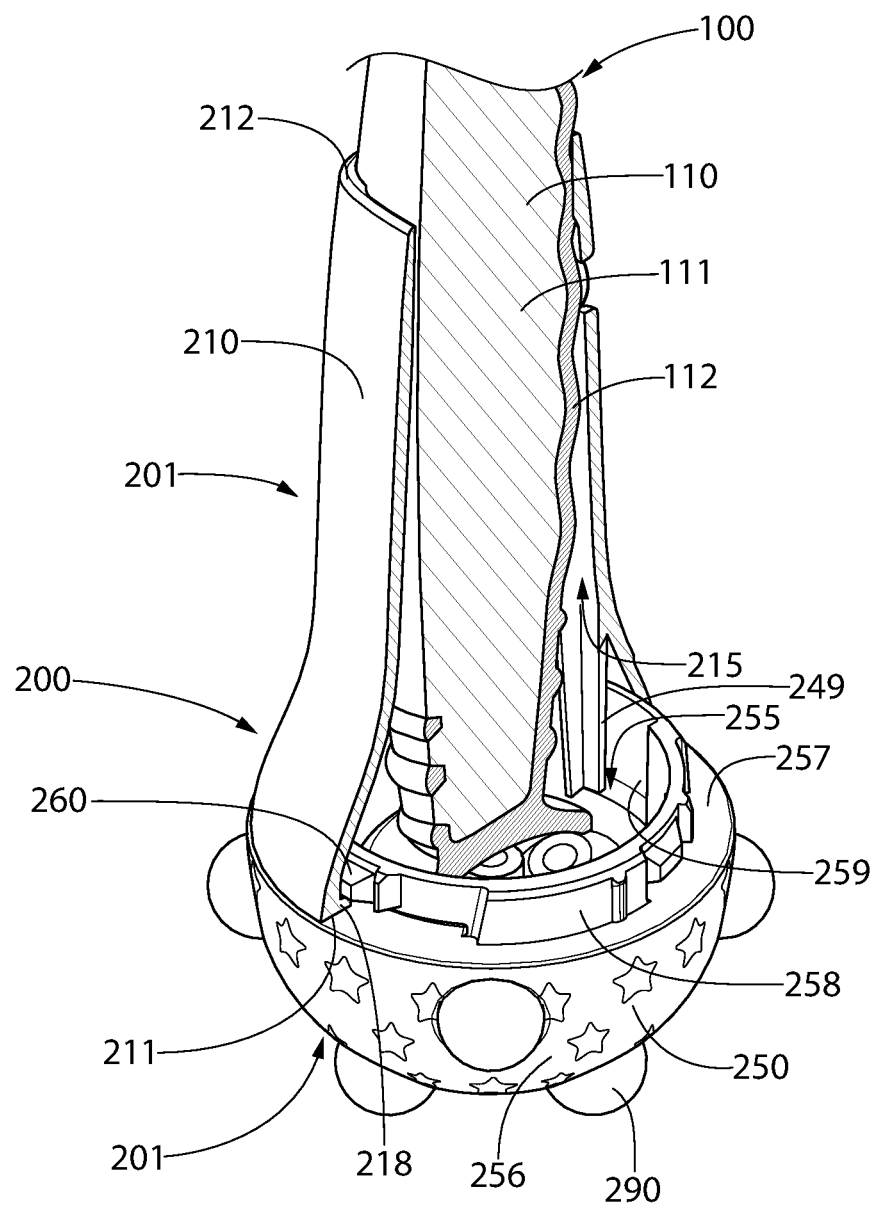
FIG. 11 is a partially cut-away view of the oral care system as shown in FIG. 10C.

FIG. 11 illustrates a partially cut-away view of the system 1000 to show the engagement between the first and second connection elements 218, 260. Specifically, as the second housing portion 250 is rotated, the tabs of the first connection element 218 slide underneath the tabs of the second connection element 260 so that an axial force on the first or second housing portions 210, 250 relative to the other will not separate the first and second housing portions 210, 250. Rather, to separate the first and second housing portions 210, 250, the second housing portion 250 must first be rotated relative to the first housing portion 210 in the opposite direction, and then pulled axially relative to the first housing portion 210.

Although the first and second connection elements 218, 260 are illustrated and described herein as being tabs, in other embodiments the first and second connection elements 218, 260 can take on other forms. For example, the first and second connection elements 218, 260 may comprise threads that matingly engage one another during rotation of the second housing portion 250 relative to the first housing portion 210. In other embodiments, the first and second connection elements 218, 260 may be formed by a cooperating protrusion/detent, key/keyhole, or similar. In still other embodiments, the first and second housing portions 210, 250 may be coupled together via an interference fit or the like. Thus, the invention is not to be particularly limited by the manner in which the first and second housing components 210, 250 are coupled together in all embodiments and variations from that which is described herein are possible.

FIG. 12 illustrates a cross-sectional view of the fully assembled oral care system 1000. As noted previously, the first portion 107 of the oral care implement 100 is located within the first portion of the receiving cavity 215 of the first housing portion 210, the second portion 108 of the oral care implement 100 protrudes from the first end 211 of the first housing portion 210, and the third portion 109 of the oral care implement 100 protrudes from the second end 212 of the first housing portion 210. Moreover, the second portion 108 of the oral care implement 100 is located within the second portion of the receiving cavity 255 of the second housing portion 250. The second portion 108 of the oral care implement 100 includes the flexible support member 115. Stated another way, the first and second portions of the receiving cavity 215, 255 of the first and second housings 210, 250 collectively define a receiving cavity that surrounds a portion of the handle 110 of the oral care implement 100. The portion of the handle 110 of the oral care implement 100 is located in both of the first and second portions of the receiving cavity 215, 255. As stated above, the proximal end 101 of the oral care implement 100 rests atop the support post 263 of the second housing portion 250.

Axial movement of the tracking attachment 200 relative to the oral care implement 100 is substantially prevented unless the first and second housing portions 210, 250 are detached from one another. Specifically, the tracking attachment 200 cannot move axially towards the distal end 102 of the oral care implement 100 due to engagement between the proximal end 101 of the oral care implement 100 and the support post 263. Furthermore, the tracking attachment 200 cannot move axially away from the distal end 102 of the oral care implement 100 due to engagement between the outer surface of the handle 110 and the inner surface of the first housing portion 210 at or near the second end 212 of the first housing portion 210. The engagement between the alignment features (e.g., the protrusion 114 on the handle 110 and the aperture 220 in the housing 201) also helps to prevent axial movement of the tracking attachment 200 relative to the oral care implement 100. Furthermore, the engagement of the alignment features also prevents rotational or angular movement between the tracking attachment 200 and the oral care implement 100.

Once the tracking attachment 200 is coupled to the oral care implement 100, the tracking attachment 200 generally remains in a static position on the oral care implement 100. Specifically, the contact/engagement between the proximal end 101 of the oral care implement 100 and the support post 263 prevents the tracking attachment 200 from moving axially towards the distal end 102 of the oral care implement 100. The engagement/contact/interaction between the outer surface of the handle 110 and the inner surface 214 of the first housing portion 210 generally prevents the tracking attachment 200 from moving axially towards the proximal end 101 of the oral care implement 100. The interaction between the protrusion 114 on the handle 110 of the oral care implement 100 and the retention feature/opening 220 in the first housing portion 210 prevents relative rotation between the tracking attachment 200 and the oral care implement 100 and also further prevents axial movement/translation of the tracking attachment 200 relative to the oral care implement 100. Of course, the tracking attachment 200 can be removed from the oral care implement 100 by separating the first and second components 201, 202 from one another, pulling the second component 201 away from the oral care implement 100, and then sliding the first housing portion 210 upwardly along the oral care implement 100 towards the proximal end 102 of the oral care implement 100 until none of the oral care implement 100 remains in the first portion of the receiving cavity 215 (i.e., reversing the oral care system assembly steps described herein).

In certain embodiments, an outer surface of the handle 110 of the oral care implement 100 is a first color, the outer surface 213 of the first housing portion 210 is a second color, and the outer surface 253 of the second housing portion 250 is a third color, the first, second, and third colors being the same. Thus, the tracking attachment 200 has a color that matches the color of the handle 110 of the oral care implement 100, providing the oral care system 1000 with a seamless appearance. Furthermore, in some embodiments there is a design feature located on the outer surface 253 of the second housing portion 250. The design feature may be a plurality of spaced apart stars, squares, triangles, irregular shapes, non-circular shapes, or the like (see, for example, the star pattern illustrated in FIG. 11). The design feature may be a fourth color which is different than the first, second, and third colors so that the design feature stands out. Furthermore, as noted above the handle 110 may include a base portion 111 and a resilient grip component 112. The resilient grip component 112 may be a fifth color, and the fifth color may be the same as the fourth color. Finally, as noted above the visual markers 290 each have a color and the visual markers 290 are arranged in sets such that no two visual markers 290 in the same set are the same color. Furthermore, the visual markers 290 are each a different color than the outer surface 253 of the second housing portion 250 and the design feature on the outer surface 253 of the second housing portion 250.

As mentioned above, when the tracking attachment 200 is attached to the oral care implement and used in conjunction with specifically formulated software and algorithms, the tracking attachment 200 assists in tracking the movement, position, orientation, location in the oral cavity (i.e., upper left quadrant, upper right quadrant, lower left quadrant, lower right quadrant, etc.) or the like of the oral care implement 100 to which it is attached. Specifically, during use a camera is positioned so that the tracking attachment 200, and more specifically the tracking unit 202 thereof (which, in the exemplified embodiment, are the visual markers 290), are in the field of view of the camera. The algorithms associated with an external electronic device may be able to track the movement, position, orientation, location in the oral cavity, or the like of the oral care implement 100 based on the colors of the visual markers 290 that the camera perceives. Thus, the tracking attachment 200 is detachably coupled to the oral care implement 100 and works in tandem with a camera, processor, memory, software, and/or algorithms to track the motion, movement, position, location, orientation, or the like of the oral care implement 100 to which the tracking element 200 is attached during a toothbrushing or oral care session. Although the tracking element 200 does not include any electronics or sensors such as accelerometer or gyroscopes in the exemplified embodiment, it could include such components in other embodiments to aid in tracking motion of the oral care implement 100.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A tracking attachment for an oral care implement, the tracking attachment comprising:
  a housing defining a receiving cavity that is configured to receive a portion of an oral care implement, the housing comprising:
    a first housing portion extending from a first end to a second end and comprising a first connection element, the first housing portion having an inner surface that defines a first portion of the receiving cavity that is open at both of the first and second ends of the first housing portion; and
    a second housing portion extending from a first end to a second end and having a second connection element that mates with the first connection element of the first housing portion to detachably couple the second housing portion to the first housing portion, the second housing portion having an inner surface that defines a second portion of the receiving cavity that is open at the second end of the second housing portion; and
  a tracking unit configured to facilitate tracking at least one of a position, orientation, or movement of the oral care implement within an oral cavity of a user;
  wherein the housing comprises an alignment feature that is configured to interact with a feature on a handle of the oral care implement to prevent relative axial and rotational movement between the oral care implement and the housing, wherein the alignment feature comprises an aperture formed through the first housing portion from an outer surface of the first housing portion to the inner surface of the first housing portion.

2. The tracking attachment according to claim 1 wherein the first and second housing portions are alterable between: (1) a detached state wherein the first and second housing portions are separate from one another; and (2) an attached state wherein the first and second housing portions are coupled together and the first and second portions of the receiving cavity collectively form the receiving cavity that is configured to receive the portion of the oral care implement.

3. The tracking attachment according to claim 2 wherein in the attached state an outer surface of the first housing portion is flush with an outer surface of the second housing portion so that an outer surface of the housing is a smooth, uninterrupted surface.

4. The tracking attachment according to claim 1 wherein the receiving cavity extends along a longitudinal axis and the first portion of the receiving cavity has a transverse cross-sectional area that decreases with distance from the first end of the first housing portion to the second end of the first housing portion such that the first cavity has a minimum cross-sectional area at the second end of the first housing portion, and wherein the first end of the first housing portion is adjacent to the second end of the second housing portion.

5. The tracking attachment according to claim 1 wherein the second housing portion has an outer surface and the inner surface and a plurality of holes extending from the outer surface to the inner surface in a spaced apart manner, and wherein the tracking unit comprises a plurality of visual markers, each of the visual markers coupled to the second housing portion within one of the plurality of holes.

6. The tracking attachment according to claim 5 wherein each of the visual markers comprises an anchor portion, a protruding portion, and an intermediate portion extending between the anchor and protruding portions, the anchor portions located within the second portion of the receiving cavity, the intermediate portions located within one of the plurality of holes, and the protruding portions protruding from the outer surface of the second housing portion.

7. The tracking attachment according to claim 6 wherein the protruding portions of each of the visual markers has a spherical or semispherical shape.

8. The tracking attachment according to claim 5 wherein the second housing portion extends from the first end to the second end along a longitudinal axis, wherein the plurality of visual markers comprises a first set of visual markers that are aligned along a first plane that is orthogonal to the longitudinal axis and a second set of visual markers that are aligned along a second plane that is orthogonal to the longitudinal axis and parallel to the first plane.

9. The tracking attachment according to claim 8 wherein each of the visual markers of the first set of visual markers is a different color and wherein each of the visual markers of the second set of visual markers is a different color.

10. The tracking attachment according to claim 5 wherein each of the first and second housing portions is formed from a rigid material and wherein each of the plurality of visual markers is formed from a resilient material.

11. The tracking attachment according to claim 1 wherein the second portion of the receiving cavity extends from a floor of the second housing portion to the second end of the second housing portion, and further comprising a support post extending from the floor towards the second end of the second housing portion for supporting a proximal end of the oral care implement.

12. The tracking attachment according to claim 1 wherein the second housing portion comprises a main portion terminating in a distal end and a neck portion extending from the distal end of the main portion to the second end of the second housing portion, and wherein when the first and second housing portions are coupled together the neck portion of the second housing portion nests within the receiving cavity and the first end of the first housing portion is in contact with the distal end of the main portion of the second housing portion.

13. The tracking attachment according to claim 1 wherein the tracking attachment is free of electronic components.

14. An oral care system comprising:

an oral care implement;

a tracking attachment coupled to the oral care implement, the tracking attachment comprising:

a housing having an inner surface that defines a receiving cavity having a closed bottom end and an open top end, a support post extending from the closed bottom end to a distal end; and a tracking unit configured to facilitate tracking at least one of a position, orientation, or movement of the oral care implement within an oral cavity of a user; and wherein a portion of the oral care implement is positioned in the receiving cavity of the housing with a proximal end of the oral care implement resting on the distal end of the support post; and wherein the housing comprises an alignment aperture and the oral care implement comprises a protrusion that extends into the alignment aperture to prevent relative axial and rotational movement between the oral care implement and the tracking attachment.

15. The oral care system according to claim 14 wherein at least a portion of the receiving cavity tapers towards the open top end, wherein an outer surface of the oral care implement is in contact with a portion of the inner surface of the housing that is adjacent to the open top end of the receiving cavity.

* * * * *